United States Patent
Iguchi et al.

(10) Patent No.: US 9,007,655 B2
(45) Date of Patent: Apr. 14, 2015

(54) IMAGE PROCESSING APPARATUS, PRINTING APPARATUS, AND IMAGE PROCESSING METHOD

(71) Applicant: Canon Kabushiki Kaisha, Tokyo (JP)

(72) Inventors: Ryosuke Iguchi, Kawasaki (JP); Nobutaka Miyake, Yokohama (JP); Akitoshi Yamada, Yokohama (JP); Mitsuhiro Ono, Tokyo (JP); Fumitaka Goto, Tokyo (JP); Hidetsugu Kagawa, Kawasaki (JP); Tomokazu Ishikawa, Yokohama (JP); Junichi Nakagawa, Tokyo (JP); Senichi Saito, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/076,710

(22) Filed: Nov. 11, 2013

(65) Prior Publication Data

US 2014/0139855 A1 May 22, 2014

(30) Foreign Application Priority Data

Nov. 16, 2012 (JP) ................. 2012-252265

(51) Int. Cl.
*H04N 1/48* (2006.01)
*H04N 1/46* (2006.01)

(52) U.S. Cl.
CPC ...................... *H04N 1/46* (2013.01)

(58) Field of Classification Search
None
See application file for complete search history.

(56) References Cited

U.S. PATENT DOCUMENTS

| 6,025,929 | A | 2/2000 | Nakajima et al. | |
|---|---|---|---|---|
| 2006/0214968 | A1* | 9/2006 | Chiwata | 347/15 |
| 2007/0115505 | A1* | 5/2007 | Kakutani | 358/3.01 |
| 2007/0121137 | A1* | 5/2007 | Kakutani | 358/1.9 |
| 2009/0097043 | A1* | 4/2009 | Gotoh | 358/1.2 |
| 2012/0243052 | A1* | 9/2012 | Kakutani | 358/3.13 |

FOREIGN PATENT DOCUMENTS

JP 10-13674 A 1/1998

OTHER PUBLICATIONS

U.S. Appl. No. 14/076,608, filed Nov. 11, 2013, Inventors: Akitoshi Yamada, Tomokazu Ishikawa, Senichi Saito, Fumitaka Goto, Nobutaka Miyake, Mitsuhiro Ono, Ryosuke Iguchi, Hidetsugu Kagawa, and Junichi Nakagawa.

(Continued)

*Primary Examiner* — Kimberly A Williams
(74) *Attorney, Agent, or Firm* — Fitzpatrick, Cella, Harper & Scinto

(57) ABSTRACT

One dither mask having a highest spacial frequency is selected from a plurality of dither masks. Next, a granularity is obtained with reference to a table based on the selected dither mask and an ejection amount level per area. Moreover, a difference in granularity between adjacent areas is calculated with respect to all of the areas. A maximum value is obtained out of the obtained differences in granularity, and then, the maximum difference in granularity is compared with a determination threshold. When the maximum difference in granularity is the threshold or greater, it is determined whether or not a dither mask having a spacial frequency lower than that of the selected dither mask is stored in a memory. When there are dither masks having lower spacial frequencies, a dither mask having a spacial frequency lower by one level than that of the selected dither mask is selected.

19 Claims, 23 Drawing Sheets

(56) References Cited

OTHER PUBLICATIONS

U.S. Appl. No. 14/076,719, filed Nov. 11, 2013, Inventors: Junichi Nakagawa, Mitsuhiro Ono, Hidetsugu Kagawa, Nobutaka Miyake, Akitoshi Yamada, Fumitaka Goto, Ryosuke Iguchi, Tomokazu Ishikawa, and Senichi Saito.

U.S. Appl. No. 14/076,622, filed Nov. 11, 2013, Inventors: Fumitaka Goto, Akitoshi Yamada, Tomokazu Ishikawa, Senichi Saito, Nobutaka Miyake, Mitsuhiro Ono, Ryosuke Iguchi, Hidetsugu Kagawa, and Junichi Nakagawa.

U.S. Appl. No. 14/076,647, filed Nov. 11, 2013, Inventors: Senichi Saito, Akitoshi Yamada, Tomokazu Ishikawa, Fumitaka Goto, Nobutaka Miyake, Mitsuhiro Ono, Ryosuke Iguchi, Hidetsugu Kagawa, and Junichi Nakagawa.

* cited by examiner

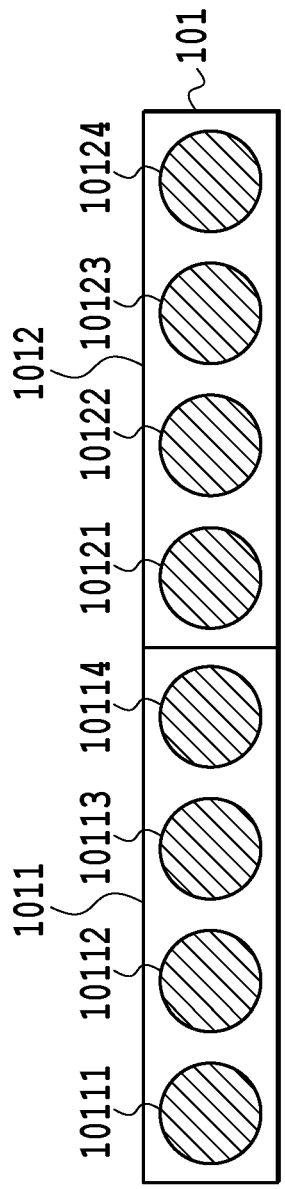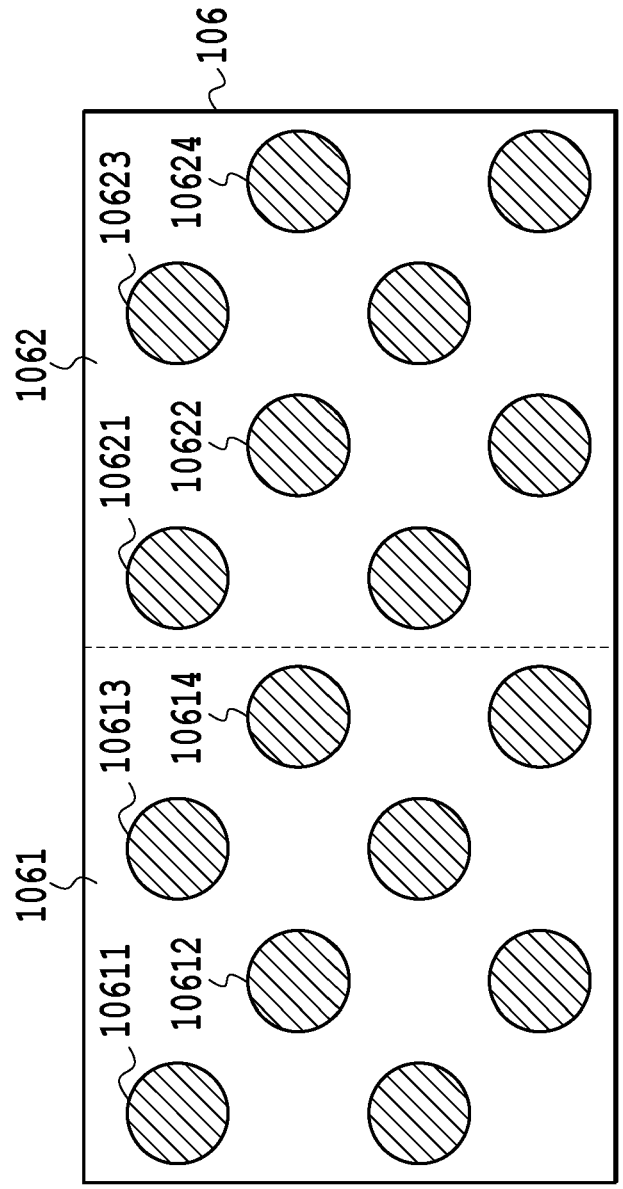

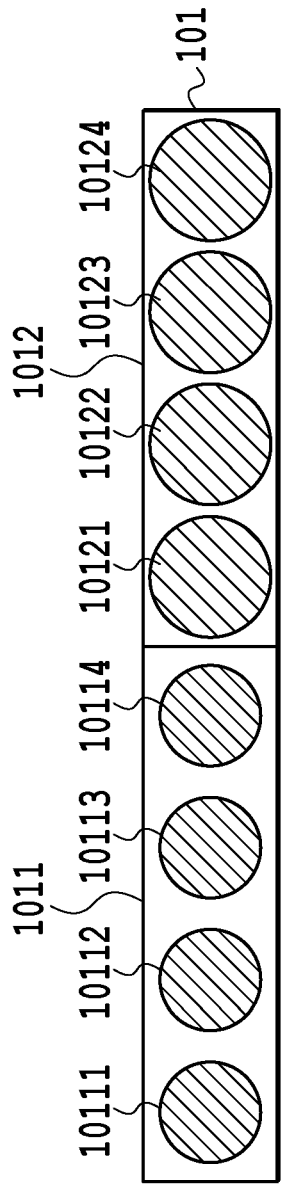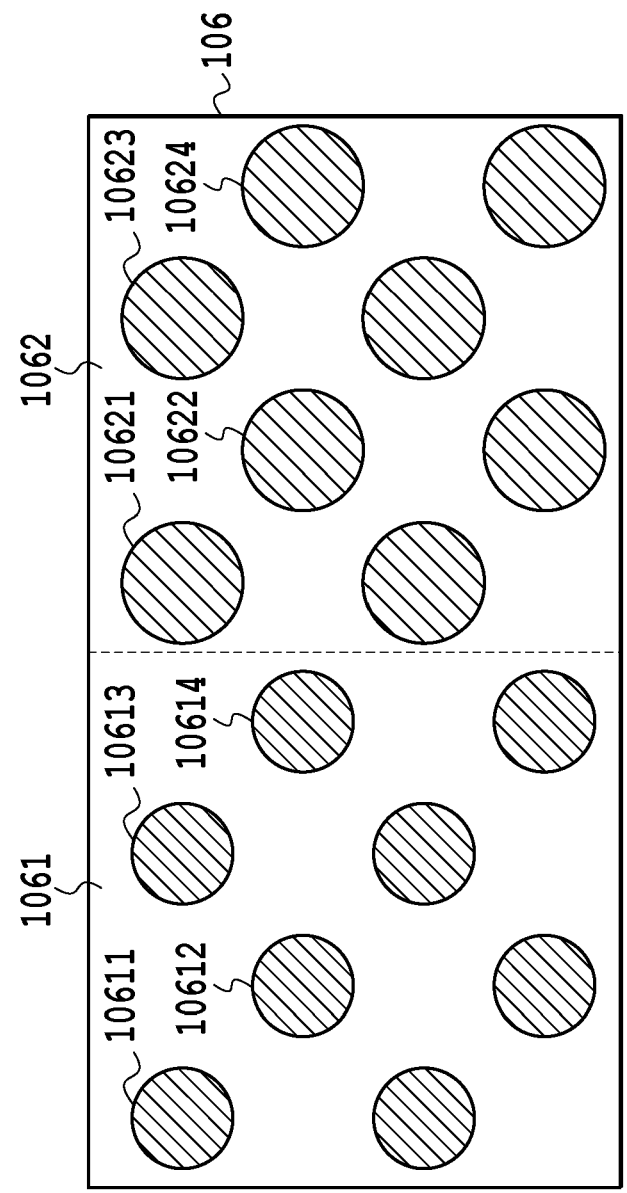

| ΔRTh | SPACIAL FREQUENCY OF DOT ARRANGEMENT PATTERN | | |
|---|---|---|---|
| | ~f1 | f1~f2 | f2~ |
| EJECTION AMOUNT LEVEL (DOT SIZE) 0 | 0.40 | 0.45 | 0.50 |
| 1 | 0.35 | 0.40 | 0.45 |
| 2 | 0.30 | 0.35 | 0.40 |
| 3 | 0.25 | 0.30 | 0.35 |
| 4 | 0.20 | 0.25 | 0.30 |
| 5 | 0.15 | 0.20 | 0.25 |
| 6 | 0.10 | 0.15 | 0.20 |

FIG.21

IMAGE PROCESSING APPARATUS, PRINTING APPARATUS, AND IMAGE PROCESSING METHOD

BACKGROUND OF THE INVENTION

1. Field of the Invention

The present invention relates to an image processing apparatus, a printing apparatus, and an image processing method. More particularly, the present invention relates to quantizing, by a dither method or the like, image data that has been subjected to correction such as head shading for suppressing density unevenness caused by variations in print characteristics of print elements.

2. Description of the Related Art

The head shading (abbreviated as "HS") technique disclosed in Japanese Patent Laid-Open No. H10-13674 (1998) has been known as one example of the correction for suppressing an uneven density of the aforementioned type. This HS technique is adapted to perform correcting based on information on ink ejection characteristics (i.e., print characteristics) of each of nozzles serving as printing elements. For example, in response to information that amount of ink to be ejected by a certain nozzle is more than normal amount, image data is corrected so as to decrease a gradation value indicated by the image data corresponding to the nozzle. In contrast, in response to information that amount of ink to be ejected by a certain nozzle is less than the normal amount, image data is corrected so as to increase a gradation value indicated by the image data corresponding to the nozzle. In this manner, the number of ink dots to be eventually printed is increased or decreased, so that the density of a print image formed based on the image data can become substantially even in each of the nozzles.

However, after the correction by the HS technique or the like, the corrected image data is quantized, and therefore, the number of dots to be eventually printed may be different according to print characteristics such as ejection amount, thereby a pattern of dot arrangement, that is, a spacial frequency on the dot arrangement is different between print elements. As a consequence, although density unevenness in the print elements may be reduced, a difference in the spacial frequency between the print elements may newly cause density unevenness (hereinafter also referred to as frequency unevenness).

In the case where, for example, ink ejection amount by a nozzle A as a print element is a normal value whereas ink ejection amount by a nozzle B adjacent to the nozzle A is larger than the normal value, a dot formed at a position to be printed by the nozzle B may be larger than that formed by the nozzle A. Here, when the data is corrected by HS processing in such a print head, the number of dots to be printed at the position where the nozzle B prints is smaller than that to be printed by the nozzle A during a printing operation based on print data obtained by quantizing the corrected data. Consequently, the number of dots is different between an area having a predetermined area where the dots are printed by the nozzle A and a area having the same area as that where the dots are printed by the nozzle B. That is to say, the same quantization causes different patterns of dot arrangement. This difference in pattern of dot arrangement leads to a difference in spacial frequency of dots, and thus, the difference is visually recognized as frequency unevenness. More specifically, even if the density unevenness caused by each of the nozzles can be overcome by the HS processing, the spacial frequency of the dot to be printed is unfavorably different among the nozzles, thus raising another problem of frequency unevenness.

SUMMARY OF THE INVENTION

An object of the present invention is to provide an image processing apparatus, a printing apparatus, and an image processing method that can reduce frequency unevenness caused by correcting variations in print characteristics of a plurality of print elements, when the print element prints an image.

In a first aspect of the present invention, there is provided an image processing apparatus that generates print data for performing printing using a printing element array in which a plurality of printing elements are arrayed, the apparatus comprising: a correction unit configured to, for each of processing units corresponding to a plurality of printing element groups respectively which are obtained by dividing a plurality of printing elements in the printing element array, correct image data of a pixel, which corresponds to the printing element in the printing element group, according to print characteristics of the printing element in the printing element group; and a quantizing unit configured to quantize the image data corrected by the correction unit using a quantizing mask, the quantizing unit selecting the quantizing mask having a smaller difference in granularity between unit areas, which is obtained for a print image in the unit area printed by the printing element group for each processing unit, which corresponds to the printing element group, from at least two quantizing masks having different spacial frequency characteristics, to perform quantization.

In a second aspect of the present invention, there is provided a printing apparatus that uses a printing element array in which a plurality of printing elements are arrayed and performs printing based on print data, the apparatus comprising: a correction unit configured to, for each of processing units corresponding to a plurality of printing element groups respectively which are obtained by dividing a plurality of printing elements in the printing element array, correct image data of a pixel, which corresponds to the printing element in the printing element group, according to print characteristics of the printing element in the printing element group; and a quantizing unit configured to quantize the image data corrected by the correction unit using a quantizing mask, the quantizing unit selecting the quantizing mask having a smaller difference in granularity between unit areas, which is obtained for a print image in the unit area printed by the printing element group for each processing unit, which corresponds to the printing element group, from at least two quantizing masks having different spacial frequency characteristics, to perform quantization.

In a third aspect of the present invention, there is provided an image processing method for generating print data for performing printing using a printing element array in which a plurality of printing elements are arrayed, the method comprising: a correction step of, for each of processing units corresponding to a plurality of printing element groups respectively which are obtained by dividing a plurality of printing elements in the printing element array, correcting image data of a pixel, which corresponds to the printing element in the printing element group, according to print characteristics of the printing element in the printing element group; and a quantizing step of quantizing the image data corrected in the correction step using a quantizing mask, the quantizing step selecting the quantizing mask having a smaller difference in granularity between unit areas, which is obtained for a print image in the unit area printed by the printing element group for each processing unit, which corresponds to the printing element group, from at least two quantizing masks having different spacial frequency characteristics, to perform quantization.

With the above-described configuration, a quantizing mask having a smaller difference in granularity between unit areas, the granularity being obtained for a print image in a unit area printed per processing unit by a print element group, is selected from quantizing masks having different spacial frequency characteristics, followed by quantization. This will enable frequency unevenness caused by correcting the variations in print characteristics of the print elements to be reduced, when an image is printed with a plurality of print elements.

Further features of the present invention will become apparent from the following description of exemplary embodiments (with reference to the attached drawings).

BRIEF DESCRIPTION OF THE DRAWINGS

FIGS. 4A and 4B are diagrams explanatory of a dot arrangement pattern formed by a print head having nozzles for ejecting ink in the same amount;

FIGS. 5A and 5B are diagrams explanatory of a dot arrangement pattern formed by a print head having nozzles for ejecting ink in different amounts;

FIG. 21 is a table explanatory of designation of determination thresholds of differences in granularity according to a third embodiment of the present invention;

DESCRIPTION OF THE EMBODIMENTS

Hereinafter, embodiments of the present invention will be explained in detail with reference to the attached drawings.

Figure 1:
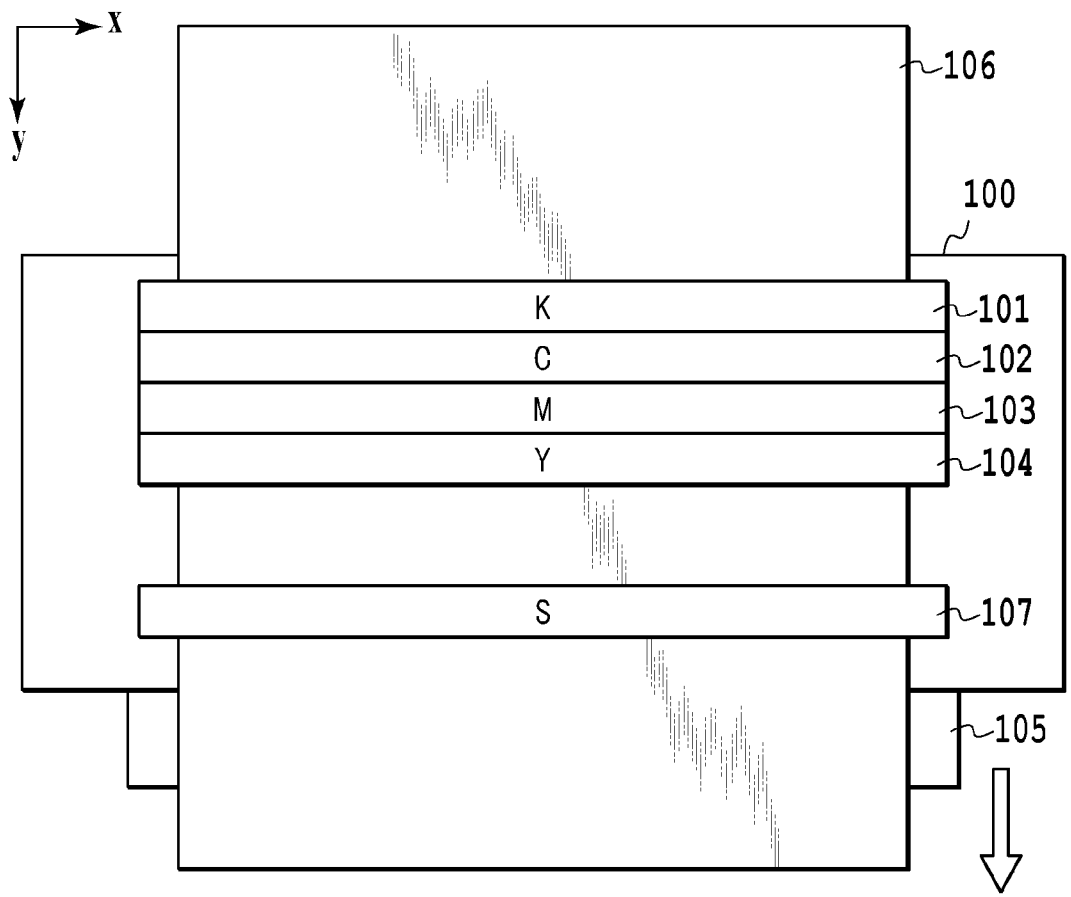
FIG. 1 is a view schematically showing an ink jet printer according to an embodiment of the present invention.

FIG. 1 is a view schematically showing an ink jet printer exemplifying an ink jet printing apparatus of the present invention. The printer in the present embodiment is a printing apparatus of a full line type, and it is provided with print heads 101 to 104, as shown in FIG. 1. Each of the print heads 101 to 104 includes nozzle arrays (i.e., printing element arrays), which correspond to the width of a print medium 106 and has a plurality of nozzles serving as printing elements for ejecting the same kind of ink, the nozzles being arrayed in an x direction, as described later with reference to FIG. 2. The print heads 101 to 104 eject black (K), cyan (C), magenta (M), and yellow (Y) inks, respectively. The print heads 101 to 104 for ejecting the plurality of kinds of inks are arranged in a y direction that is a conveyance direction of the print medium.

Figure 2:
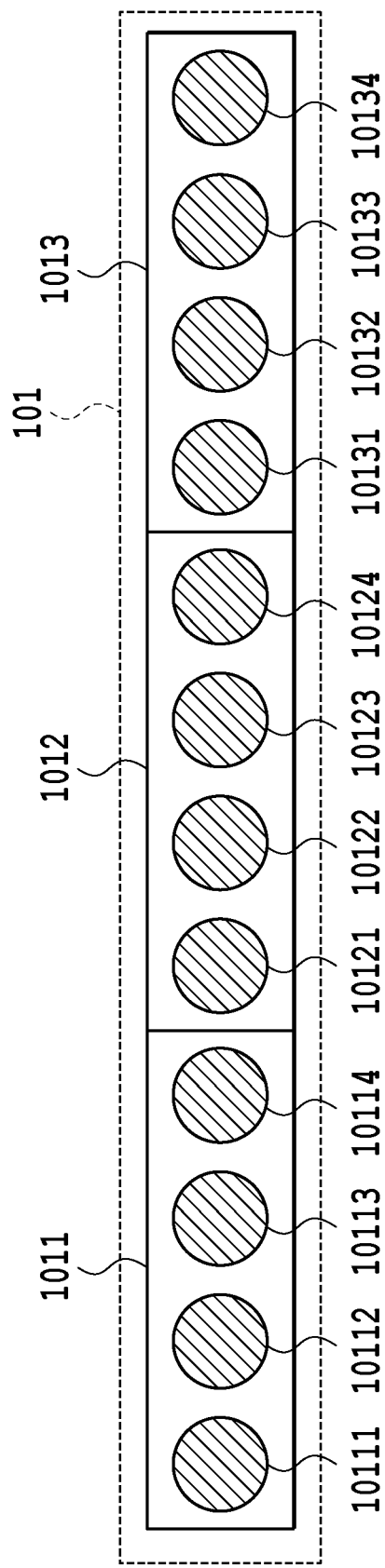
FIG. 2 is a diagram illustrating the configuration of a print head of an embodiment usable in the present invention.

FIG. 2 illustrates the details of a nozzle array in each of the print heads 101 to 104. As illustrated in FIG. 2, each of the print heads (e.g., 101) has a plurality of ejection boards 1011 to 1013 arranged in the x direction illustrated in FIG. 1. Each of the ejection boards is provided with the nozzles, a heater for generating thermal energy to be used for ejection, an ink passage, and the like. In each of the print heads (e.g., 101), one ejection board includes four nozzle arrays, each of which consists of a plurality of nozzles arrayed at 600 dpi in the x direction in FIG. 1, and which are arranged to be shifted from each other by a distance corresponding to 2400 dpi (not illustrated). In this manner, each of the print heads includes a nozzle array, which consists of the plurality of nozzles arrayed in the x direction at a density of 2400 dpi as a whole. That is, for the sake of simplification of the illustration, FIG. 2 illustrates the four nozzle arrays unified into a nozzle array as one nozzle array consisting of nozzles (10111 to 10114, 10121 to 10124, and 10131 to 10134) that are arrayed in a density of 2400 dpi. Moreover, FIG. 2 illustrates one board including four nozzles for the sake of simplification of the illustration and description.

Referring to FIG. 1 again, the print medium 106 is conveyed in the y direction crossing the x direction in FIG. 1 when a conveyance roller 105 (and other rollers, not shown) is rotated by the driving force of a motor, not shown. During the conveyance of the print medium 106, ink is ejected from the plurality of nozzles in each of the print heads 101 to 104 based on print data at a frequency corresponding to the conveyance speed of the print medium 106. Consequently, dots of each color are formed at a predetermined resolution based on the print data, and then, an image is printed on the print medium 106.

Figure 6A:
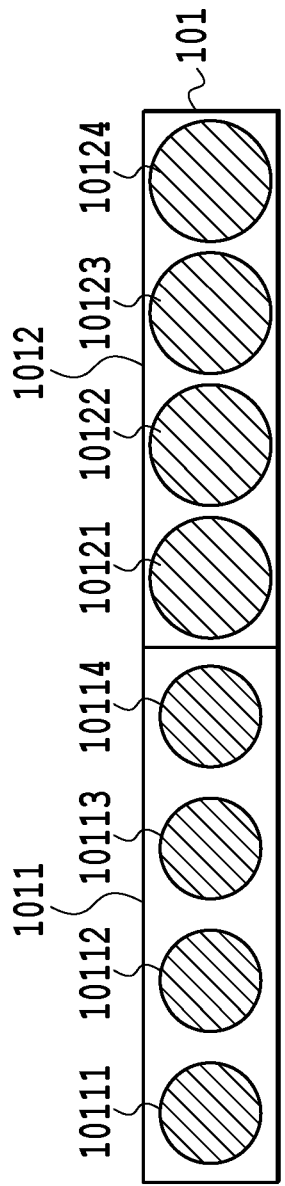
FIGS. 6A and 6B are diagrams explanatory of a dot arrangement pattern after the print head illustrated in FIG. 5A has been subjected to HS processing.

A scanner 107 is provided downstream, in the conveyance direction, of the print heads 101 to 104 arranged in the y direction. The scanner 107 has reading elements arranged at a predetermined pitch in the x direction, and thus, is used for reading an image, for example, reading the density of a patch printed on the print medium when a correction parameter for HS (abbreviating "head shading"), described later with reference to FIG. 6A, is generated. And then, the scanner 107 outputs RGB data as a reading result.

Incidentally, a printing apparatus, to which the present invention is applicable, is not limited to the above-described full-line type apparatus. For example, the present invention is applicable also to a so-called serial type printing apparatus in which print heads are configured in such a manner as to scan a print medium in a direction crossing a conveyance direction of a print medium so as to print the image. Moreover, although the print heads are provided in a manner corresponding to the ink colors in the present embodiment, a single print head may eject a plurality of color inks. Furthermore, nozzle arrays corresponding to a plurality of color inks may be arrayed on a single ejection board.

Figure 3:
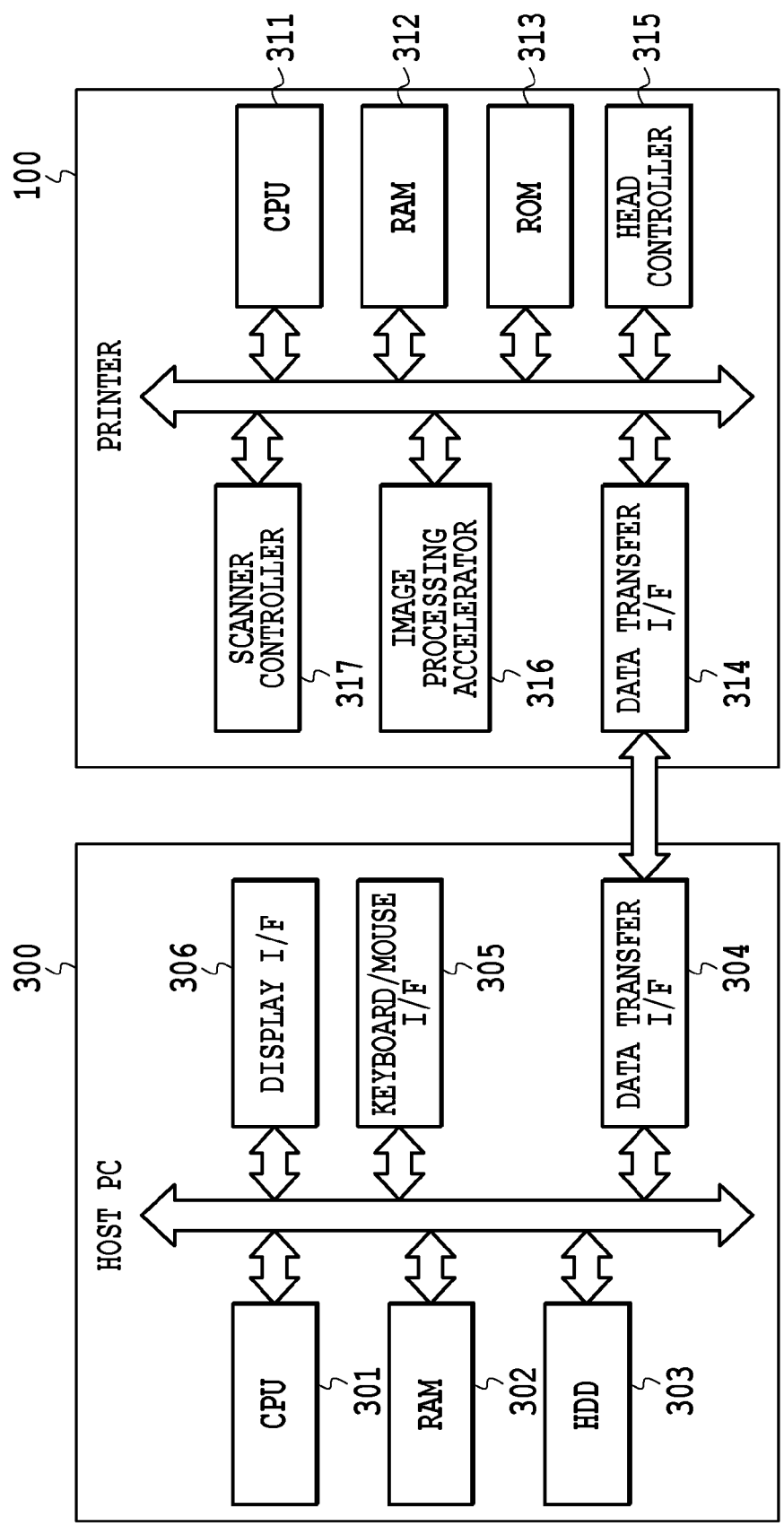
FIG. 3 is a block diagram illustrating a printing system according to an embodiment of the present invention.

FIG. 3 is a block diagram illustrating a printing system including the printer shown in FIG. 1 and a personal computer (abbreviated as a "PC") 300 serving as a host apparatus.

The host PC 300 principally includes the following constituent elements. A CPU 301 performs processing in accordance with a program stored in an HDD 303 or a RAM 302 serving as a storing part. The RAM 302 is a volatile storing part, for temporarily storing a program or data therein. In the meantime, the HDD 303 is a non-volatile storing part, for storing a program or data therein in the same manner. A data transfer I/F (abbreviating an "interface") 304 is adapted to control the transmission or reception of data to or from a printer 100. This data transmission or reception connecting system is achieved by using a USB, IEEE1394, a LAN, or the like. A keyboard/mouse I/F 305 is designed to control an HID (abbreviating a "human interface device") such as a keyboard or a mouse. A user can input data via the I/F 305. A display I/F 306 controls displaying by a display, not shown.

In the meantime, the printer 100 principally includes the following constituent elements. A CPU 311 performs processing in an embodiment regarding the HS, described later, in accordance with a program stored in a ROM 313 or a RAM 312. The RAM 312 is a volatile storing part, for temporarily storing a program or data therein. The ROM 313 is a non-volatile storing part capable of storing therein table data or a program to be used in the HS, described later.

A data transfer I/F 314 controls the transmission or reception of data to or from the PC 300. A head controller 315 supplies print data to each of the print heads 101 to 104 shown in FIG. 1, and controls an ejecting operation by the print heads. Specifically, the head controller 315 reads a control parameter and print data stored at a predetermined address of the RAM 312. When the CPU 311 writes the control parameter and the print data at the predetermined address of the RAM 312, the head controller 315 starts processing so as to eject ink from the print head. A scanner controller 317 controls each of the reading elements in the scanner 107 shown in FIG. 1, and then, outputs the RGB data obtained by the reading elements to the CPU 311.

An image processing accelerator 316 is hardware capable of performing image processing at a speed higher than that of the CPU 311. Specifically, the image processing accelerator 316 reads a parameter and data required for the image processing from a predetermined address of the RAM 312. When the CPU 311 writes the parameter and data at the predetermined address of the RAM 312, the image processing accelerator 316 is started up to cause the data to be subjected to predetermined image processing. In the present embodiment, software executed by the CPU 311 performs processing of creating parameters of a correction table to be used in an HS processing part, described later. In the meantime, the hardware of the image processing accelerator 316 performs image processing at the time of printing including the processing by the HS processing part. Here, the image processing accelerator 316 is not an essential constituent element. Therefore, it is to be understood that only the CPU 311 may perform the table parameter creation and the image processing according to the specifications of a printer.

A description will be given below of an embodiment in which spacial frequency unevenness due to HS processing for correcting density unevenness caused by variations in ejection characteristics of the plurality of nozzles is reduced in the above-described printing system.

FIGS. 4A and 4B illustrate a print head including four nozzles having the same ejection amount in a nozzle group (i.e., a print element group) as a processing unit in HS processing and patterns of dot arrangement formed with ink ejected from the print head, respectively. FIG. 4A illustrates a nozzle array in the print head 101 for ejecting a black ink. FIG. 4A illustrates only eight nozzles out of the nozzles in the nozzle array in the print head described above with reference to FIG. 2 for the sake of simplification of the description and illustration. Nozzle groups 1011 and 1012, each consisting of the four nozzles (10111 to 10114 and 10121 to 10124), correspond to processing units in HS processing, described later. The nozzles are arrayed in a density of 2400 dpi. Moreover, the nozzle groups 1011 and 1012 are disposed in the ejection boards 1011 and 1012 different from each other (the nozzle group and the ejection board are designated by the same reference numerals respectively in FIG. 4A). FIG. 4A illustrates an example in which the four nozzles in each of the nozzle groups eject ink in the same normal ejection amount, and further, the nozzle groups eject ink in the same ejection amount.

Obviously, descriptions below are proper irrespective of the same or different ejection boards including the nozzle groups. More specifically, ejection characteristics (e.g., ejection amount) may be varied according to the boards from the viewpoint of fabrication accuracy or the like in the case of the different ejection boards. However, ejection characteristics may be varied in the plurality of nozzles arrayed on the board due to a fabrication error, a use history, or the like even in the case of the same board. It is to be understood that the present invention is applicable to such cases.

FIG. 4B is a diagram illustrating a dot arrangement on a solid image of a 50% duty printed on the print medium 106 by the print head illustrated in FIG. 4A. Here, in FIGS. 4A and 4B, the size of the nozzle and the size of the dot printed by the nozzles are the same as each other for the sake of comparison between the sizes. However, it is to be understood that the sizes are not always the same as each other in an actual print head and apparatus. Additionally, the amount of ink to be ejected from each of the nozzles may be varied due to causes other than the diameter of the nozzle, and therefore, the diameters of the nozzles are not always different from each other. In the drawings, the nozzle having the larger ejection amount is depicted by a larger circle.

All of the eight nozzles 10111 to 10114 and 10121 to 10124 in the print head 101 can eject ink in the normal amount in a normal direction, and therefore, dots having the same size are printed on the print medium 106 at a predetermined interval. As a consequence, the patterns of dot arrangement printed in areas 1061 and 1062, each having the same predetermined area, are the same as each other in the print medium 106, and therefore, the spacial frequencies in the areas become the same as each other. That is to say, there is no difference in spacial frequency between the areas 1061 and 1062 printed by the adjacent nozzle groups 1011 and 1012, each of which corresponds to an HS processing unit, thus causing no frequency unevenness. Specifically, in this case, the ejection amount of each of the nozzle groups 1011 and 1012 as the HS processing units is normal, and therefore, an HS parameter generated by processing, described later with reference to FIG. 8A, has zero correction amount (i.e., no correction of image data). Consequently, even if image data on a solid image of a 50% duty is subjected to HS processing, the same pattern of dot arrangement as the pattern illustrated in FIG. 4B is printed.

In contrast, FIGS. 5A and 5B are diagrams illustrating a print head including nozzle groups 1011 and 1012 having different ejection amounts and dot arrangement patterns printed with ink ejected from the nozzle groups 1011 and 1012, respectively, and are similar to FIGS. 4A and 4B, respectively. The pattern of dot arrangement illustrated in FIG. 5B shows the print states of a solid image of a 50% duty.

In a print head illustrated in FIG. 5A, it is assumed that four nozzles 10111 to 10114 in a nozzle group 1011 have normal ejection amount whereas four nozzles 10121 to 10124 in a nozzle group 1012 have ejection amount larger than the normal amount. In the case of the use of such a print head, areas corresponding to the nozzle groups may be visually recognized as having different densities. In an example illustrated in FIG. 5B, a solid image is printed in a normal density in an area 1061 printed by the four nozzles in the nozzle group 1011. In contrast, dots having a size larger than a normal size because of larger ejection amount are formed in an area 1062 printed by the four nozzles in the nozzle group 1012, so that a solid image is printed in a density higher than that in the area 1061. In other words, the visual density may be different between the areas 1061 and 1062. The four nozzles in each of the nozzle groups have the same ejection amount in an example illustrated in FIG. 5B. However, it is to be understood that four nozzles may have different ejection amounts, and consequently, the sizes of dots to be formed may be different from each other. The example illustrated in FIG. 5B is adapted to simplify the explanation. Moreover, the ejection characteristics (i.e., the ejection amount in the above-described example) of the nozzle group as the processing unit in the HS processing are represented by the average characteristics of the four nozzles, as described later, and therefore, there is no problem if the nozzle groups have one and the same ejection amount.

With the print head having the ejection characteristics described above with reference to FIGS. 5A and 5B, the HS parameters generated in the processing described later with reference to FIG. 8A have correction amounts other than zero (i.e., correcting the image data). As a consequence, image data is corrected with correction amounts other than zero in the HS processing.

Figure 6B:
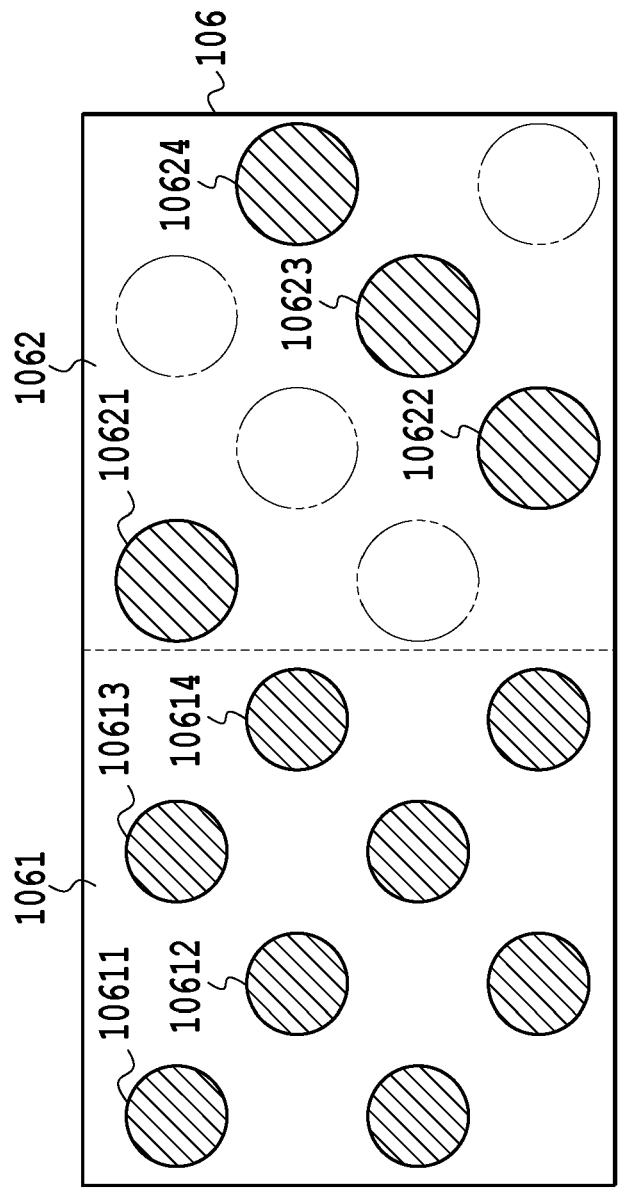

FIGS. 6A and 6B are diagrams explanatory of printing based on data obtained by quantizing image data corrected by the HS processing with a conventional dither mask.

FIG. 6A illustrates the same contents as those illustrated in FIG. 5A, and illustrates a print head having nozzle groups of different ejection characteristics (i.e., print characteristics) corresponding to the HS processing units. The use of this print head enables image data in a processing unit corresponding to the nozzle group 1012 in the HS processing to be corrected, and then, to decrease the pixel value (i.e., the gradation value) of the image data. More particularly, it is possible to correct the image data in such a manner as to decrease the gradation value of each of the pixels corresponding to the four nozzles as the processing unit with respect to the image data.

Thereafter, when a printing operation is performed based on data obtained by quantizing the image data after the HS correction with the conventional dither mask, the dot arrangement patterns illustrated in FIG. 6B are obtained. Specifically, the printing operation is performed in such a manner that the number of dots printed in the area 1062 corresponding to the nozzle group 1012 becomes smaller than that of dots printed in the area 1061 corresponding to the nozzle group 1011. Incidentally, FIG. 6B illustrates an example in which image data on a solid image of a 50% duty is printed, like that illustrated in FIG. 5B.

Here, the area of each of the dots formed with ink ejected from the nozzles 10121 to 10124 in the right nozzle group 1012 in FIGS. 6A and 6B is assumed to be twice the area of each of the dots formed with ink ejected from the nozzles 10111 to 10114 in the left nozzle group 1011. In this case, it is assumed that the number of dots printed in the predetermined area 1062 by the nozzles 10121 to 10124 in the nozzle group 1012 is about a half (i.e., two dots to one dot) of the number of dots printed in the area 1061 by each of the nozzles 10111 to 10114 in the nozzle group 1011 by the HS processing. Consequently, the area of a print medium covered with the dots becomes substantially equal between the areas. In this manner, the number of dots printed in each of the areas is adjusted in the HS processing such that the densities detected in the areas on the print medium become substantially uniform. In actuality, although a covered area and a density to be detected are not always proportional to each other, a description will be given of the embodiment in which the number of dots in a twice area is halved.

As illustrated in FIG. 6B, dots having a normal size are alternately arranged in a regular fashion in the area 1061 based on print data whose image data is not corrected in the HS processing. In the example illustrated in FIG. 6B, eight dots are arranged per unit area of the area 1061 (i.e., the maximum number of dots: 4×4=16). In contrast, in the area 1062 based on the print data including the image data whose pixel value is decreased in the HS processing, dots having the size larger than the normal size are arranged at positions different from those in the area 1061 (more sparsely than in the area 1061). In the example illustrated in FIG. 6B, four dots are arranged per unit area. In this manner, the pattern of dot arrangement is different, so that the spacial frequency of the dot arrangement is varied in each of the areas. A difference in spacial frequency between the areas may be visually recognized as frequency unevenness. In the example illustrated in FIG. 6B, the pattern of dot arrangement in the area 1061 has a high frequency because of the dense dot arrangement: in contrast, the pattern of dot arrangement in the area 1062 has a low frequency because of the sparse dot arrangement. Moreover, when the dots occupy a half of the unit area or larger, a portion not having dots arranged therein becomes small, and therefore, its spacial frequency becomes low. In summary, a portion having no dots printed therein and a portion completely covered with dots become the same spacial frequency. The granularity of the dots can be calculated based on the spacial frequency of the dot arrangement pattern. Its calculating method may utilize already-known RMS granularity, the Wiener spectrum, or the like.

As described above, the HS processing adjusts the number of dots to be printed such that the total area of the dots printed in the area 1061 is equal to that of the dots printed in the area 1062. In this manner, a density observed with optical absorption characteristics of the area 1061 becomes equal to that observed with optical absorption characteristics of the area 1062, and thus, both of the areas can be visually recognized in substantially the same color and at the same density.

However, as described above, the spacial frequencies of the areas 1061 and 1062 are different from each other because of the different patterns of dot arrangement, and therefore, the different spacial frequencies are visually recognized as frequency unevenness, thus degrading a quality of a print image.

Incidentally, the above-described variations in the ejection characteristics may occur even in a multi-level printing apparatus capable of changing the size of a dot such as a four-level printing apparatus for performing a printing operation with, for example, three types of large, middle, and small dots. Hence, the present invention is applicable to not only a two-level printing apparatus but also a multi-level printing apparatus of three levels or more.

Embodiments of the present invention described below are adapted to reduce the above-described difference in spacial frequency by quantization.

(First Embodiment)

Figure 7:
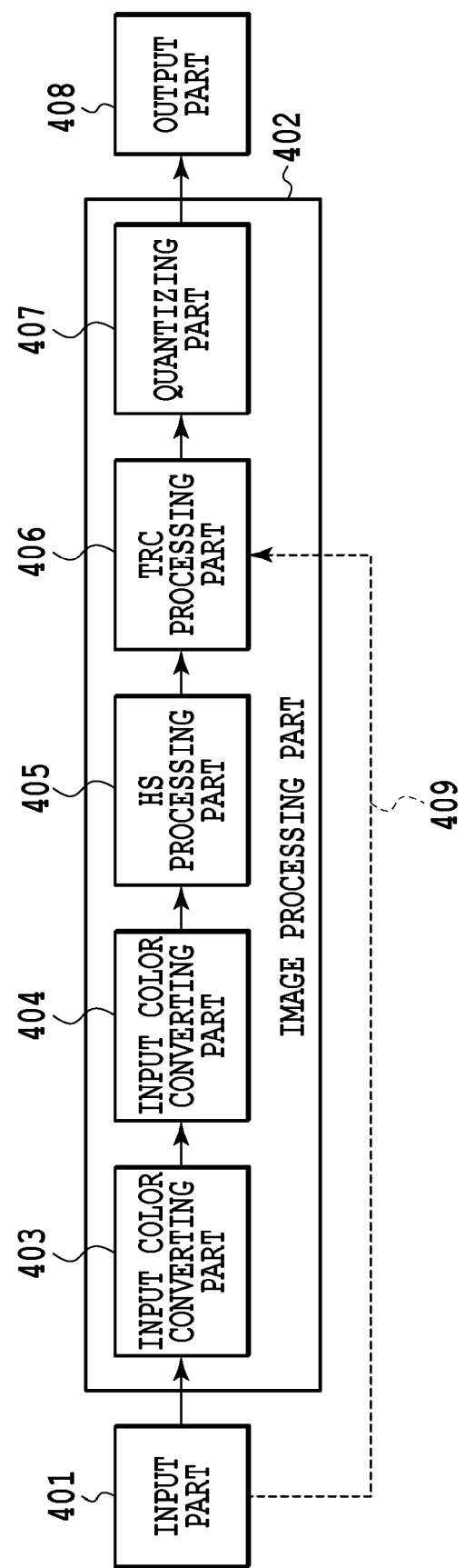
FIG. 7 is a block diagram illustrating the structure of image processing to be performed by the ink jet printer according to the embodiment of the present invention.

FIG. 7 is a block diagram illustrating the structure of image processing to be performed by an ink jet printer according to a first embodiment of the present invention. That is to say, an image processing part of the present embodiment is made up of the elements required for controlling and processing in the printer 100 illustrated in FIG. 3. Here, it should be construed that the present invention is applicable to not only this configuration but also other configurations. For example, the image processing part may be made up of the elements in the PC 300 illustrated in FIG. 3. Alternatively, a part of the image processing may be made up of elements of the PC 300 whereas the other parts of the image processing part may be made up of the elements of the printer 100. Such image processing parts will be referred to as an image processing apparatus in the present specification.

As shown in FIG. 7, an input part 401 outputs image data received from the host PC 300 to an image processing part 402. The image processing part 402 is constituted by including an input color converting part 403, an ink color converting part 404, an HS processing part 405, a TRC (abbreviating "tone reproduction curve") processing part 406, and a quantizing part 407.

In the image processing part 402, first, the input color converting part 403 converts the input image data received from the input part 401 into image data according to a color reproduction area by the printer. In the present embodiment, the input image data represents color coordinates (R, G, B) in color space coordinates based on the sRGB that indicates colors represented on a monitor. The input color converting part 403 converts the R, G, and B input image data, each having 8 bits, into image data (R', G', B') corresponding to the color reproduction area by the printer by a known technique such as matrix operation or processing using a three-dimensional look-up table (abbreviated as a "3DLUT"). In the present embodiment, interpolation is performed simultaneously with the processing using the 3DLUT, thus achieving the conversion. Here, the resolution of the 8-bit image data to be processed in the image processing part 402 in the present embodiment is 2400 dpi, and further, the resolution of binary data obtained by quantization in the quantizing part 407 also is 2400 dpi.

The ink color converting part 404 converts the R, G, and B image data, each having 8 bits, processed by the input color converting part 403 into image data that is color signal data on ink to be used in the printer. Since the printer 100 in the present embodiment uses black (K), cyan (C), magenta (M), and yellow (Y) inks, the image data on an RGB signal is converted into image data consisting of 8-bit color signals representing K, C, M, and Y inks. This color conversion also is achieved by simultaneously using an interpolating operation with the 3DLUT in the same manner as the above-described processing by the input color converting part 503. Here, the technique of a matrix operation or the like may be used as another converting technique in the same manner as described above.

The HS processing part 405 receives the image data on the ink color signal and subjects the 8-bit data per ink color to correction according to the ejection characteristics of each of the nozzles constituting the print head.

The TRC processing part 406 subjects the image data consisting of the 8-bit ink color signals that have been subjected to the HS processing to correction for adjusting the number of dots to be printed by an output part 408 per ink color. In general, no linear relationship is built between the number of dots to be printed on a print medium and an optical density achieved by the print medium with the number of dots. Consequently, the TRC processing part 406 adjusts the number of dots to be printed on a print medium by correcting the 8-bit image data, so as to build the linear relationship.

The quantizing part 407 quantizes the 256-value and 8-bit image data on the ink color, the image data having been processed in the TRC processing part 406, thereby generating binary data of 1 bit, in which "1" indicates printing whereas "0" indicates non-printing. Incidentally, the present invention is not limited to a configuration in which the 8-bit image data is converted directly into binary data (i.e., dot data). For example, the 8-bit image data may be once quantized to multi-valued data consisting of several bits, and in the end, may be converted into binary data with a dot arrangement pattern. Moreover, the quantizing method may adopt dithering, like in the present embodiment, or may adopt other processing methods with a pseudo half tone such as error dispersion.

The quantizing part 407 switches modes of quantization according to variations (i.e., differences) in the ejection characteristics of the nozzles to be corrected in the HS processing, described later with reference to FIGS. 12A to 12D onwards.

The output part 408 drives the print head to eject each color ink onto the print medium for performing printing based on the binary data (i.e., the dot data) obtained by the quantization. In the present embodiment, the output part 408 includes a print mechanism provided with the print heads 101 to 104 shown in FIG. 1.

Next, a description will be given of generation of correction parameters to be used in the above-described HS processing part 405. In the HS processing, image data per HS processing unit is corrected with a correction parameter generated according to a density to be measured in each unit area on a print medium to be printed by a nozzle group corresponding to the HS processing unit.

Figure 8A:
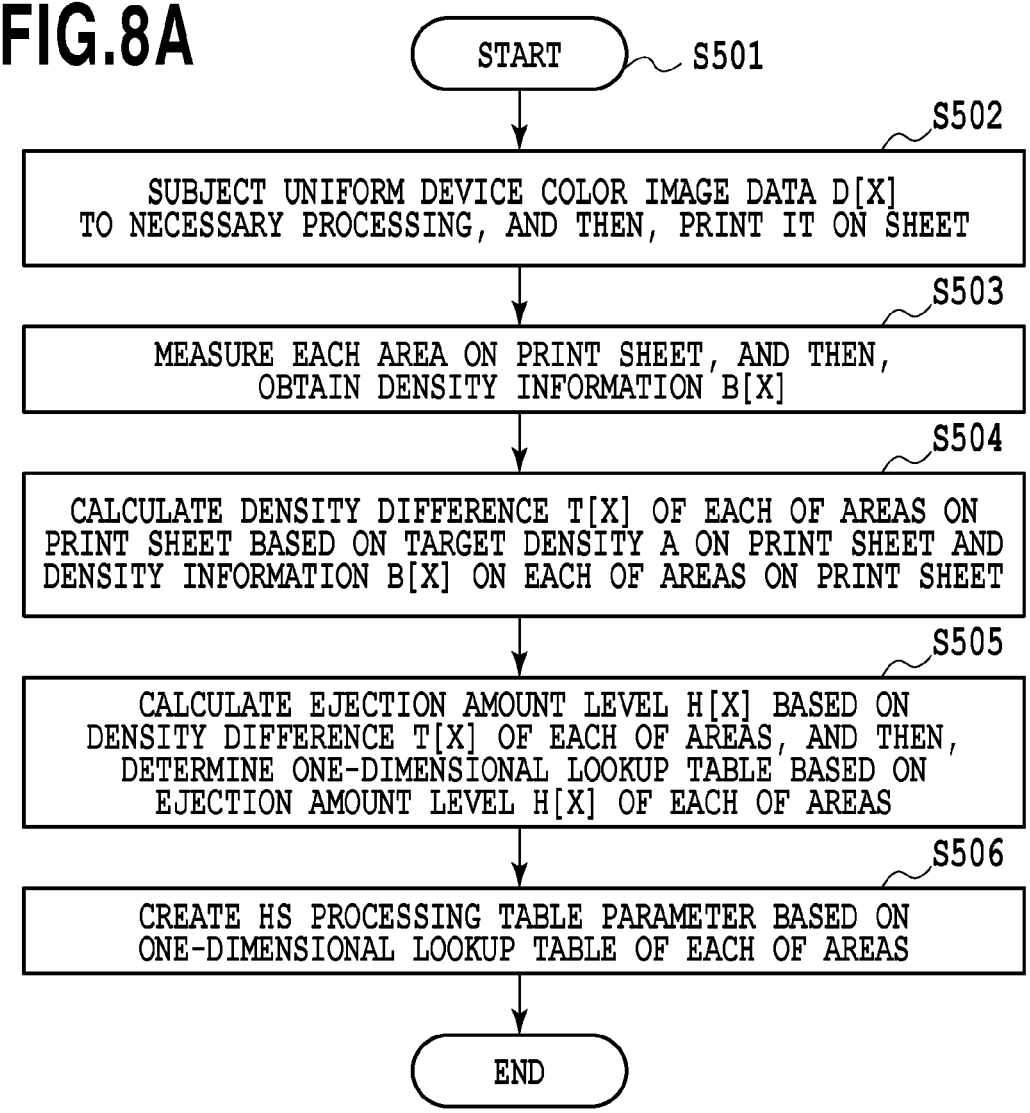
FIGS. 8A and 8B are flowcharts illustrating parameter generation in the HS processing and the HS processing according to the embodiment of the present invention, respectively.

FIG. 8A is a flowchart illustrating processing to be performed by the CPU 311, for generating correction parameters in a conversion table to be used in the HS processing part 405 in the present embodiment. In the present embodiment, this parameter generation is forcibly or selectively performed when a printer is fabricated, a printer is used for a predetermined period of time, or a printer performs a printing operation by predetermined amount. Alternatively, the parameter generation may be performed before every printing operation. More specifically, this processing may be performed as so-called calibration, thereby updating table parameters contained in a conversion table.

Upon the start of the table parameter generation used in the HS processing part, first in step S502, the ink is ejected from all of the nozzles of each of the print heads shown in FIG. 1, thus printing a measuring image (i.e., a patch) on a print medium. In this case, a measuring image (i.e., a patch) having a signal value of 0 or 255 is used with respect to each of pieces of data C, M, Y, and K. For example, a measuring image to be used for measuring the density of a cyan ink may be assumed that (C, M, Y, K)=(255, 0, 0, 0) whereas a measuring image to be used for measuring the density of a magenta ink may be assumed that (C, M, Y, K)=(0, 255, 0, 0).

Explanation will be made below on printing a measuring image in association with each of the parts illustrated in FIG. 7. In printing a measuring image, the input part 401 reads measuring image data from a predetermined memory. This measuring image data represents the aforementioned ink colors C, M, Y, and K. The measuring image data (hereinafter referred to as "device color image data D[X]") is input directly into the TRC processing part 406 not through the input color converting part 403, the input color converting part 404, and the HS processing part 405. Such a route is indicated by a broken line 409 in FIG. 7 as a bypass route. In processing through the bypass route, a table in which an input value is equal to an output value is prepared, and then, the device color image data D[X] is input into the TRC processing part 406. Here, the input value may be output as it is irrespective of X.

Thereafter, the same processing as that with respect to image data during a normal printing operation is performed in the TRC processing part 406 and the quantizing part 407 that performs normal processing without replacing a dither mask in the present embodiment, described later, and thus, the output part 408 prints the measuring image on the print medium 106.

Here, reference character X designates a value specifying the HS processing unit, that is, a position of the processing unit in the x direction. More specifically, reference character X denotes a processing unit in correcting the image data corresponding to each of the nozzle groups when the plurality of nozzles arrayed in the x direction are divided into nozzle groups, each consisting of four nozzles in each of the print heads 101 to 104 shown in FIG. 1. The device color image data D[X] corresponds to each of the four nozzles and is printed by the four nozzles corresponding to the processing unit X.

Figure 9A:
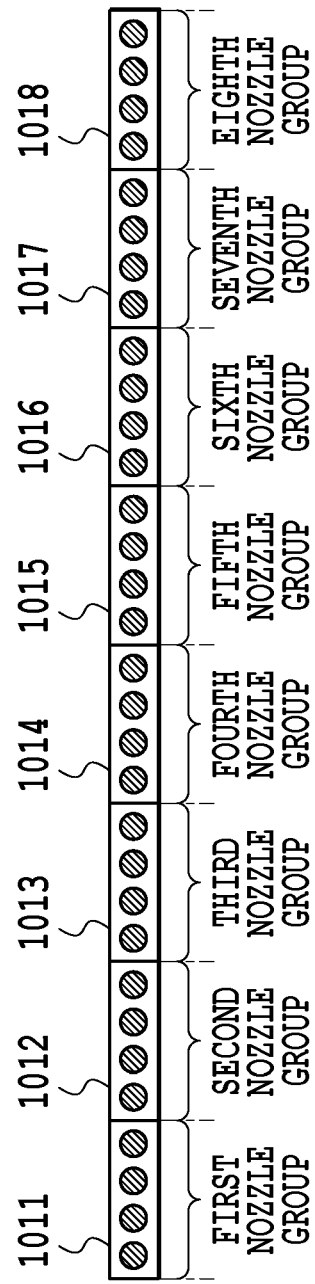
FIGS. 9A and 9B are diagrams explanatory of nozzle groups in the print head and areas to be printed by the nozzle groups, respectively.

FIG. 9A illustrates nozzle groups corresponding to the processing units. One-dimensional lookup tables containing correction parameters are applied to the nozzle groups, thus subjecting the image data in the processing unit to the HS processing per nozzle group.

Figure 9B:
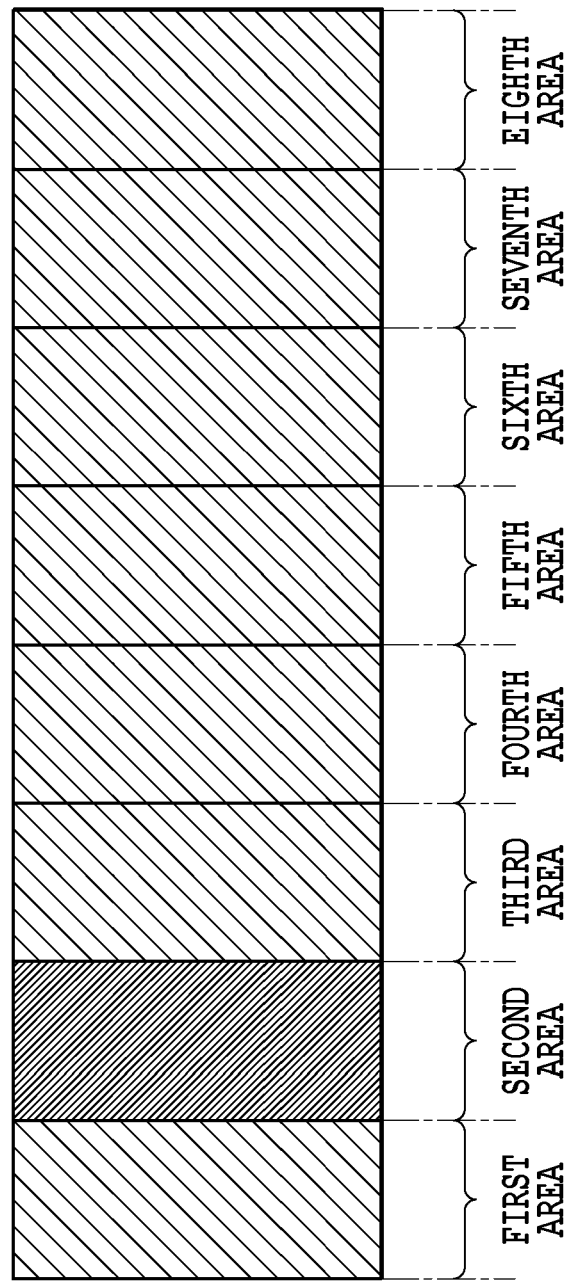

FIG. 9B is a diagram explanatory of the print state of the measuring image printed in step S502 described above. A unit area corresponding to each of the nozzle groups (hereinafter referred to also as an "area") are associated with the HS processing units X. FIG. 9B illustrates that four nozzles in a second nozzle group 1012 corresponding to a second area out of nozzles eject ink in amount larger than the normal amount.

This results in printing a measuring image, in which the density of the second area including the nozzles having the ejection amount larger than the normal amount is higher than the normal density of other areas.

Referring to FIG. 8A again, in next step S503, the scanner 107 measures the density of the measuring image printed on the print medium 106 in step S502, thereby obtaining density information B[X] per area [X]. In the present embodiment, the resolution of the scanner, that is, an array pitch of reading elements arrayed in the scanner is not particularly limited: namely, the resolution may be higher or lower than 2400 dpi that is the print resolution of the print head. Moreover, the scanner 107 need not always be the same full-line type as the print heads, as shown in FIG. 1. The scanner 107 may be of a serial type for performing colorimetry in a predetermined period of time while moving in the x direction in FIG. 1. Alternatively, the scanner 107 may be prepared separately from the printer. In this case, a signal connection may be made between a scanner and a printer, so that a measurement result may be automatically input into the printer from the scanner. Additionally, the density information B[X] need not always represent RGB. For example, the density information B[X] may have any formats such as L*a*b* measured by a colorimeter. As long as a colorimetric result B[X] of the area corresponding to four nozzles by various kinds of processing such as averaging can be properly obtained, the colorimetry may be performed at any resolutions in any formats, and thus, the colorimetry can be applied to the present embodiment. In this manner, the measuring image is printed on the print medium by the print head 101 shown in FIG. 1 based on the device color image data D[X]. And then, the scanner 107 acquires the density information B[X] per area (i.e., unit area) corresponding to each of the nozzle groups (each of which consists of the four nozzles in the present embodiment). Incidentally, the print head 101 is adapted to eject a black ink, and when its device color image data D[X] is assumed such that (C, M, Y, K)=(0, 0, 0, 255), the measuring image is formed with only the black ink.

Explanation will be made below on the assumption that a processing unit X corresponding to a first area is equal to 1 whereas another processing unit X corresponding to a second area is equal to 2, and further, density information B[1] on the first area is expressed by (R1, G1, B1) whereas density information B[2] on the second area is expressed by (R2, G2, B2).

In step S504, a density fluctuation T[X] in the area [X] is calculated based on a target density A=(Rt, Gt, Bt) and the density information B[X] obtained in step S503. Here, the target density A signifies a target colorimetric value in the case where the printer in the present embodiment performs a printing operation based on a signal that (C, M, Y, K)=(0, 0, 0, 255) in the case of, for example, a black ink, and then, performs colorimetry. Actually, the target density A is a colorimetric result, by the scanner 107, of an image printed by the nozzles having the normal ejection amount.

First in this processing, assuming that a difference between the density information B[X] and the target density A is represented by a density difference S[X], the density difference S[X] is calculated, as follows:

$$\text{Density difference } S[1]=B[1]-A=(R1-Rt, G1-Gt, B1-Bt); \text{ and}$$

$$\text{Density difference } S[2]=B[2]-A=(R2-Rt, G2-Gt, B2-Bt).$$

Figure 10:
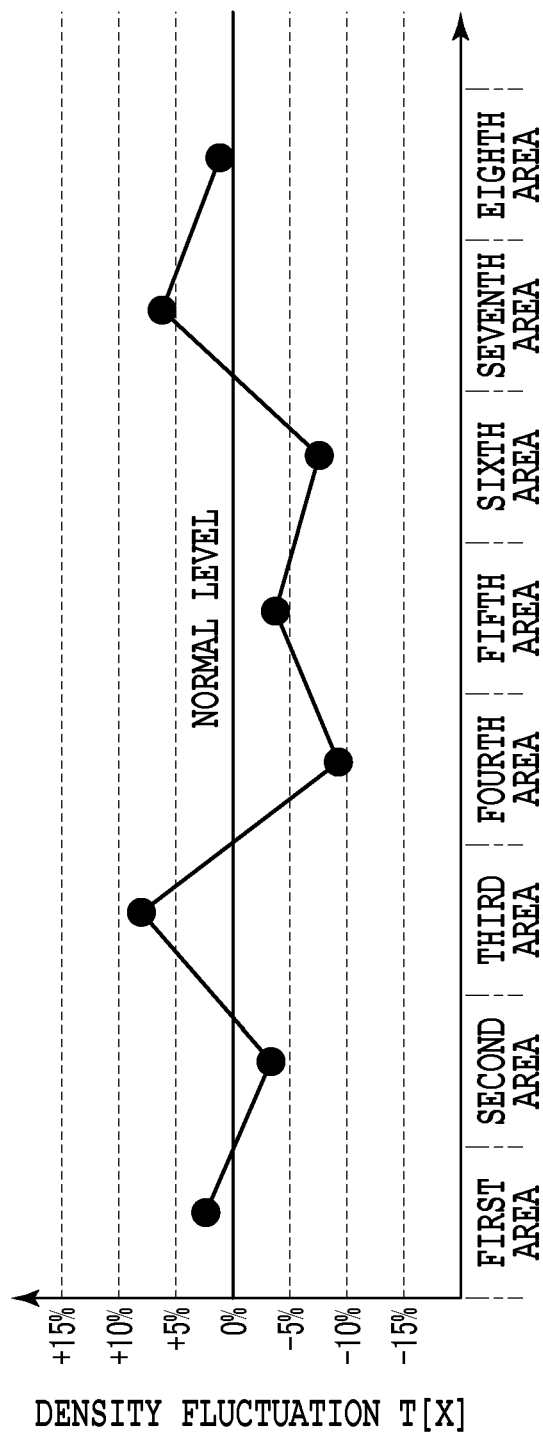
FIG. 10 is a graph illustrating a difference in density from normal ejection amount in each of the nozzle groups per area.

In the present embodiment, since a first nozzle group corresponding to a first area (see FIG. 9A) has the normal ejection amount, the values R1, G1, and B1 are basically equal to Rt, Gt, and Bt, respectively, so that the density difference S[1] becomes zero. In the meantime, since a nozzle group corresponding to a second area performs a printing operation in ejection amount larger than the normal amount, values smaller than the target density A (Rt, Gt, Bt) (i.e., a high density) are detected. Subsequently, the density fluctuation T[X] is obtained from the density difference S. The density fluctuation T[X] relatively represents a fluctuation of ejection amount compared with the target density (i.e., the normal ejection amount), and therefore, can be indicated by an increase rate or decrease rate from the normal ejection amount. FIG. 10 is a graph illustrating a relationship of the density fluctuation T[X] to each of the areas [X]. The density fluctuation T[X] may be determined from a table obtained by previously tabulating the relationship between the density difference S and the density fluctuation T or obtained as the function of, for example, the density difference S divided by the target density A.

Figure 11:
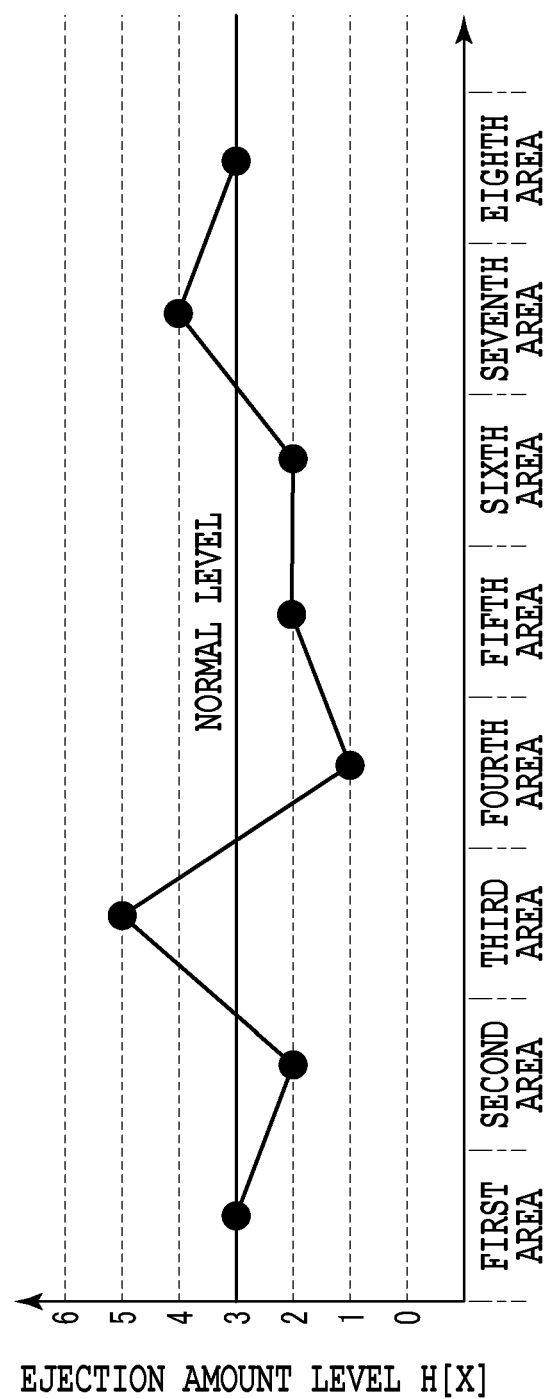
FIG. 11 is a graph illustrating ejection amount levels calculated based on the difference in density in each of the nozzle groups per area.

Referring to FIG. 8A again, an ejection amount level H[X] is obtained from the density fluctuation T[X] of each of the areas [X] in next step S505. In the present embodiment, a threshold judgment with respect to the density fluctuation T[X] is simply performed, and then, the ejection amount level H[X] is determined according to the judgment result. As illustrated in FIG. 10, the threshold judgment determines the ejection amount level H[X] based on a range within which the density fluctuation falls ( . . . , 0% to +5%, 5% to +10%, . . . ). For example, the area [8] having an ejection amount of +2% with respect to the normal ejection amount has an ejection amount level of 3, as illustrated in FIG. 11. Next, one-dimensional lookup table is selected from a plurality of one-dimensional lookup tables according to the ejection amounts that are previously stored in the RAM 312 of the printer 100 based on the ejection amount level H[X] determined as described above. FIG. 11 is a graph illustrating a relationship of the determined ejection amount level H[X] to each of the areas [X]. For example, the ejection amount level is 3, as illustrated in FIG. 11, in the area [8] having an ejection amount of +2% with respect to the normal ejection amount in the example illustrated in FIG. 10. A third one-dimensional lookup table stored in the HDD 303 is selected with respect to an ejection amount level of 3, and then, this table is applied to the area [8]. Incidentally, the method for determining the one-dimensional lookup table per area based on the density fluctuation T[X] is not limited to the above-described threshold judgment, and therefore, a one-dimensional lookup table may be dynamically created according to the density fluctuation T[X].

Subsequently in step S506, the one-dimensional lookup table per processing unit X, determined based on the ejection amount level H[X] of the area [X] corresponding to the processing unit X, is stored in the RAM 312 as correction parameters in the HS processing.

Figure 8B:
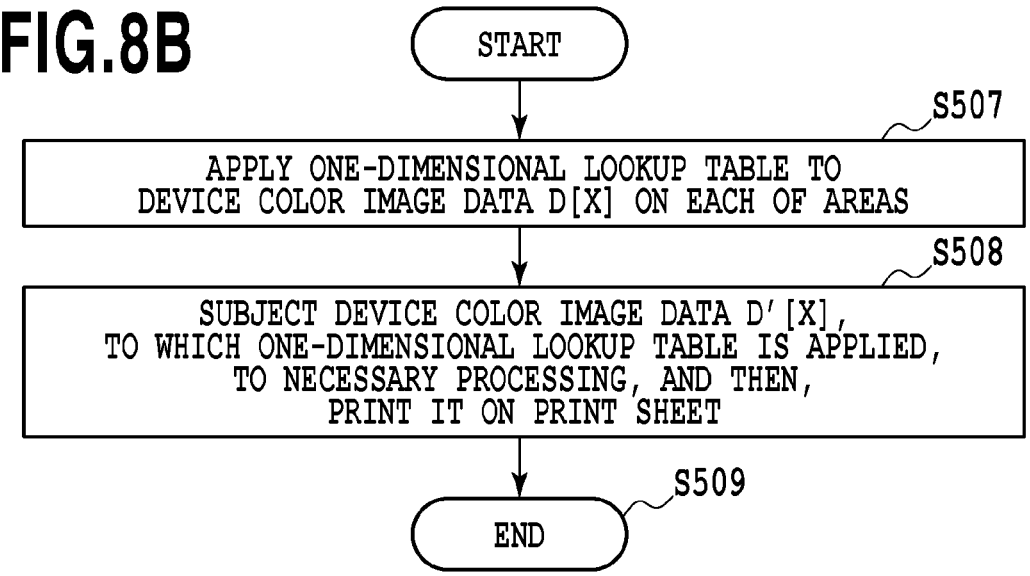

FIG. 8B is a flowchart illustrating the HS processing with the correction parameters generated in the processing illustrated in FIG. 8A and printing based on the correction parameters. As described above with reference to FIG. 7, in step S507, the HS processing part 405 first corrects the device color image data D[X] with the correction parameters corresponding to the processing unit X per processing unit X, and then, generates corrected device color image data D'[X]. More particularly, a pixel value of each of four pixels in the device color image data D[X] is corrected with the same correction parameter corresponding to the processing unit X, thus obtaining corrected device color image data D'[X] consisting of respective corrected pixel values of the four pixels.

Thereafter, in step S508, the pixel values of the four pixels in the image data D'[X] are subjected to processing in the TRC processing part 406 and quantizing including replacing a dither mask in the quantizing part 407, described later with reference to FIGS. 12A to 12D onwards, and then, an image is printed on the print medium 106 in the output part 408. Although the HS processing unit corresponds to the nozzle group consisting of the four nozzles in the above-described example, the number of nozzles corresponding to the processing unit does not matter. The judgment results of the ejection amounts over the entire print head are stored in the HDD 303 in the PC 303. These parameters are referred to in switching the quantization, described later.

At the time of the above-described generation of the correction parameters for the HS processing, parameters capable of suppressing the number of dots to about a half are created in the case of the four nozzles 10121 to 10124 of the nozzle group 1012 illustrated in FIG. 6A, as illustrated by the area 1062 in FIG. 6B. In contrast, parameters that do not change the number of dots are created in the case of the four nozzles 10111 to 10114 of the nozzle group 1011, as illustrated by the area 1061 in FIG. 6B. In other words, as the ejection amount level is greater than the normal level, the number of dots to be printed on the print medium is more decreased. In contrast, as the ejection amount level is smaller than the normal level, the number of dots to be printed on the print medium is more increased.

As described above, the HS processing per processing unit X controls the number of dots. As a consequence, the density becomes substantially even between the areas corresponding to the processing units. However, as described above with reference to FIG. 6B and the like, the spacial frequency of the dot arrangement pattern may be different per area [X]. Consequently, a difference in frequency of dots between the areas [X] appears as frequency unevenness (density unevenness). The greater the difference in a pattern of dot arrangement, the higher the visibility of the frequency unevenness. Specifically, the greater the difference of the ejection amount level H[X], the greater the frequency unevenness in FIG. 11.

Explanation will be made below on switching the quantization, thus reducing the frequency unevenness in one embodiment of the present invention. First, the degree of variations of the ejection amount (i.e., a difference in ejection amount) is calculated based on the ejection amount level H[X] of the area [X] illustrated in FIG. 11. As described above, as the degree of variations of the ejection amount becomes greater, the frequency unevenness of an image to be printed on the print medium is easy to be visually recognized: in contrast, as the degree of variations becomes smaller, the frequency unevenness is hardly visually recognized.

In the present embodiment, the degree of variations of the ejection amount is defined as a difference between the maximum and minimum values of the ejection amount level H[X]. In the distribution of the ejection amount level H[X] illustrated in FIG. 11, the maximum value is 5 of the ejection amount level H[3] of the third area whereas the minimum value is 1 of the ejection amount level H[4] of the fourth area. As a result, a difference ΔH in ejection amount level is expressed by the following equation:

Difference $\Delta H$ in ejection amount level$=|H[3]-H[4]|=4$.

As the difference becomes greater, the patterns of dot arrangement on an image to be printed on the print medium are varied. In contrast, when there is no difference between the maximum and minimum values of the ejection amount level H[X], that is, ΔH is equal to zero, a difference in ejection amount between the areas [X] becomes substantially even, and therefore, the frequency unevenness hardly occurs even after the HS processing.

Although the degree of the variations in the ejection amount is defined as the difference between the maximum and minimum values of the ejection amount level H[X], as described above, it may be defined as the sum of differences in ejection amount level H[X] between the adjacent areas [X]. Here, the ejection amount levels to be compared with each other are not limited to the levels of the adjacent areas. For example, ejection amount levels H[X] are extracted at every arbitrary distance in an image to be printed on a print medium, and then, the sum of the resultant differences may represent the degree of the variations. Here, the arbitrary distance is exemplified by a distance in consideration of human visual characteristics. Human eyes most readily visually recognize the unevenness of a spacial frequency of about 1.0 cycle/mm. In view of this, a distance at which the unevenness is most readily visually recognized may be set, and then, a difference in ejection amount level H[X] per distance may be taken. The degree of variations calculated is stored in the RAM 312 in the printer 100.

The quantization in the quantizing part 407 is switched according to the degree of the variations in the ejection amount, as described above. Specifically, a plurality of dither masks are previously read from the HDD 303 in the PC 300, and then, they are stored in the RAM 312 in the printer 100. The plurality of dither masks stored are different in spacial frequency from each other. One dither mask, by which the frequency unevenness can be most reduced, is selected based on the degree of the variations in the ejection amount. Here in the present embodiment, the spacial frequency of the dither mask is defined as a spacial frequency on an arrangement pattern of dither thresholds that output binary data "1" indicating that dots are to be printed when a median of 128 in a range from 0 to 255 of a gradation value as pixel values of 8-bit image data is input.

In general, an image printed based on print data quantized with a dither mask having a higher spacial frequency has a lower granularity, thus achieving an image of a higher quality of an image. However, the use of a dither mask having a higher spacial frequency increases a difference in spacial frequency, that is, a difference in granularity in the case where there are two kinds of dot arrangement patterns that are different in the number or arrangement of dots. In contrast, although a dither mask having a lower spacial frequency increases the granularity of an image to be printed on a print medium, a difference in granularity becomes smaller than that with the dither mask having the higher spacial frequency in the case where there are two kinds of dot arrangement patterns that are different in the number or arrangement of dots.

A description will be given below of the switching of the dither mask under an idea that the above-described difference in granularity caused by the difference in dot arrangement pattern becomes smaller with the dither mask having a lower spacial frequency. The description will be given below of a nozzle group (i.e., a maximum ejection nozzle group) for ejecting ink in amount larger by 10% than the normal ejection amount (i.e., a difference in ejection amount of 0%) and a nozzle group (i.e., a minimum ejection nozzle group) for ejecting ink in amount smaller by 10% than the normal ejection amount. Here, a difference between spacial frequencies of the dot arrangement patterns that are formed by two out of the above-described nozzle groups is referred to as frequency unevenness.

First, a plurality of dither masks having different spacial frequencies have been previously determined, and then, they have been stored in the RAM 312. A dither mask A capable of most reducing a granularity with respect to a nozzle group in the case of the normal ejection amount is first prepared, as one example. With reference to the dither mask A, a dither matrix B having a spacial frequency of a threshold arrangement pattern decreased by a predetermined amount is prepared. At least two or more dither masks are prepared in the present embodiment. It is desirable that with reference to the dither mask A, a plurality of dither masks, each having a spacial frequency stepwise decreased, such as a dither mask C and a dither mask D, should be prepared.

Next, a plurality of nozzle groups having different ejection amounts are prepared. For example, it is desirable that nozzle groups of ejection amounts stepwise varied should be prepared besides a nozzle group of normal amount, a nozzle group of maximum ejection amount, and a nozzle group of minimum ejection amount.

As described above with reference to, for example, FIG. 8A, the HS processing 405 (see FIG. 7) is not performed in the image processing part 402 (see FIG. 7), and further, the selective use of the plurality of dither masks prepared achieves the quantization. Based on the result, images are printed on a print medium with use of the plurality of nozzle groups. The measuring image is desired as the print image, as described above with reference to FIG. 8A.

With the above-described processing, the measuring images are printed by the number obtained by multiplying the number of dither masks by the number of nozzle groups. The scanner 107 reads each of the measuring images. A granularity for each combination between the dither mask and the ejection amount is calculated based on the reading result. The result is stored in the RAM 312 in the printer 100 as table parameters. Consequently, when the ejection amount of the nozzle group is found, the granularity of the print image after the quantization with each of the dither masks can be obtained.

In addition, an acceptable granularity from the viewpoint of a quality of an image has been previously checked, and then, a granularity threshold has been created in the present embodiment. Images having various granularities are actually printed, and then, the granularity accepted by human visibility is experimented, thus obtaining the granularity threshold. The granularity threshold is designated by RTh. The granularities obtained with the above-described dither masks A to D by the nozzle group having the maximum ejection amount and the nozzle group having the minimum ejection amount are determined, and then, they are compared with the granularity threshold RTh. Only the dither masks having the granularities lower than the granularity threshold RTh are stored in the RAM 312 in the printer 100. For example, in the case where the granularities of the dither masks A and B are lower than the granularity threshold RTh whereas the granularities of the dither masks C and D are higher than the granularity threshold RTh, only the dither masks A and B are stored in the RAM 312. In this manner, even if the nozzles are accidentally fabricated in such a manner as to have the ejection amount falling within the range (+10% to −10%), the use of either one of the dither masks stored in the RAM 312 allows the granularity of an image to be printed to fall within the allowable range.

As described above, the table parameters including the granularities for the combinations of the dither masks and the ejection amounts are stored, so that the granularity can be obtained without printing the image on the print medium.

Next, a dither mask optimum for reducing the frequency unevenness is selected from the plurality of dither masks prepared as described above. First, a threshold of a difference in granularity visually recognized as frequency unevenness by human eyes has been previously determined. That is to say, the difference in granularity is calculated with two different dot arrangement patterns printed on a print medium. The differences in granularity are obtained with respect to sets of a plurality of dot arrangement patterns different in granularity. And then, the differences in granularity are sequentially varied, and thus, the minimum difference in granularity that is visually recognized as frequency unevenness is referred to as a determination threshold $\Delta$RTh. Although the determination threshold $\Delta$RTh should be desirably obtained by experiments as described above, its method is not limited to this. Explanation will be made below on the assumption that the determination threshold $\Delta$RTh is 3.

Figure 12A:
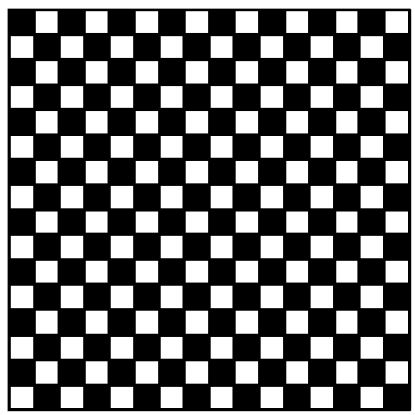
FIGS. 12A to 12D are diagrams explanatory of dot arrangement patterns obtained by quantizing the number of dots different in ejection amount level with two kinds of dither masks having different spacial frequencies.
Figure 12C:
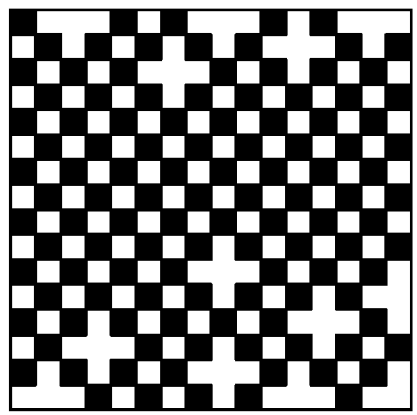
Figure 12B:
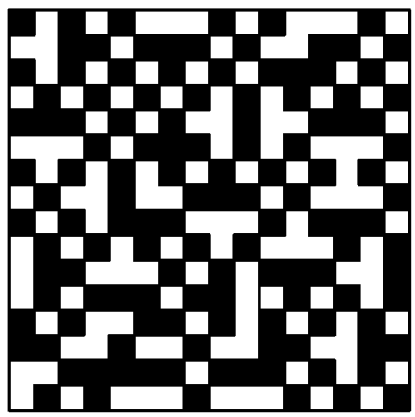
Figure 12D:
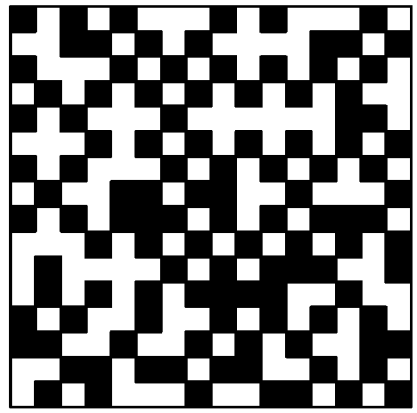

FIGS. 12A to 12D are diagrams explanatory of patterns of dot arrangement to be printed by two nozzle groups having different ejection amount levels based on print data quantized with the use of the two dither masks A and B having different spacial frequencies. Here, the size of the dither mask is 16 pixels×16 pixels (=256 pixels), and further, a pixel value of image data to be quantized is "128" with respect to all of the pixels. Additionally, the dither mask A has a high frequency, as described above, whereas the dither mask B has a frequency lower than that of the dither mask A. When image data having a pixel value of "128" is input, the image data having a pixel value of "128" is output as it is without any HS correction in the case of a nozzle group of the normal ejection amount. When the image data is quantized with the dither mask A capable of most decreasing the granularity with respect to the nozzle group of the normal ejection amount and the dither mask B having a frequency lower than that of the dither mask A, dot arrangement patterns illustrated in FIGS. 12A and 12B are obtained, respectively. As is obvious from the comparison between FIGS. 12A and 12B, the spacial frequency of the dot arrangement pattern formed with the dither mask A is higher than that with the dither mask B. In contrast, when the image data having a pixel value of "128" is input in the same manner, image data having a pixel value of "115" is output after the pixel value is corrected to be reduced by the HS processing in the case of a nozzle group of the maximum ejection amount. When the image data is quantized with the dither mask A and the dither mask B in the same manner, dot arrangement patterns illustrated in FIGS. 12C and 12D are obtained, respectively.

The ejection amounts of the two nozzle groups compared above are 0% and +10%, respectively, as illustrated in FIG. 10, and in other words, there is a difference in ejection amount of 10%. Assuming that the density of an image printed on a print medium and the number of dots is proportional to each other when the nozzle group of the normal ejection level prints 128 dots, a pixel value of "128" corresponding to the nozzle group of the maximum ejection level is reduced to 90%, that is, corrected to a pixel value of "115" by the HS processing. Thereafter, the corrected image data is quantized with the dither matrix, followed by printing. The dot arrangement patterns formed with the dither masks A and B in this case are illustrated in FIGS. 12C and 12D, respectively.

Figure 13B:
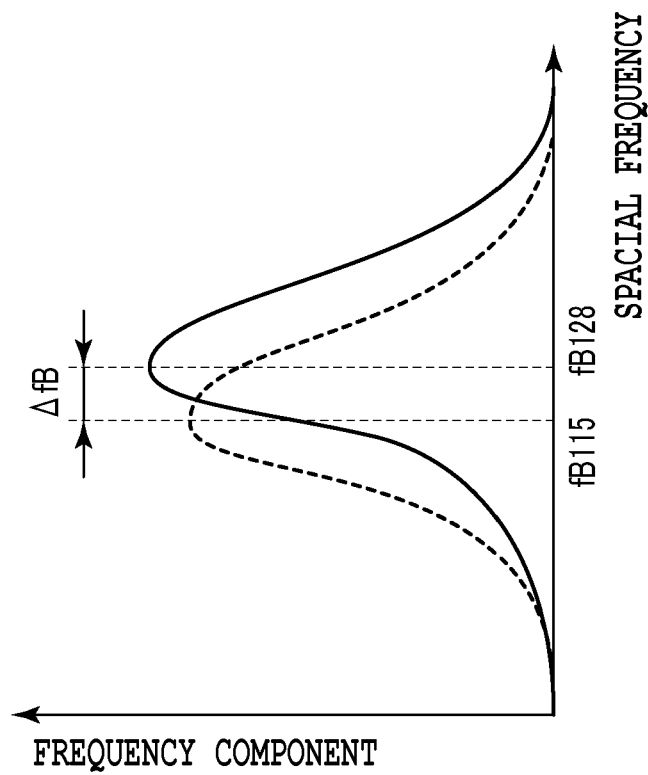
FIGS. 13A and 13B are graphs explanatory of the spacial frequency dispersion of each of the dot arrangement patterns illustrated in FIGS. 12A to 12D.
Figure 13A:
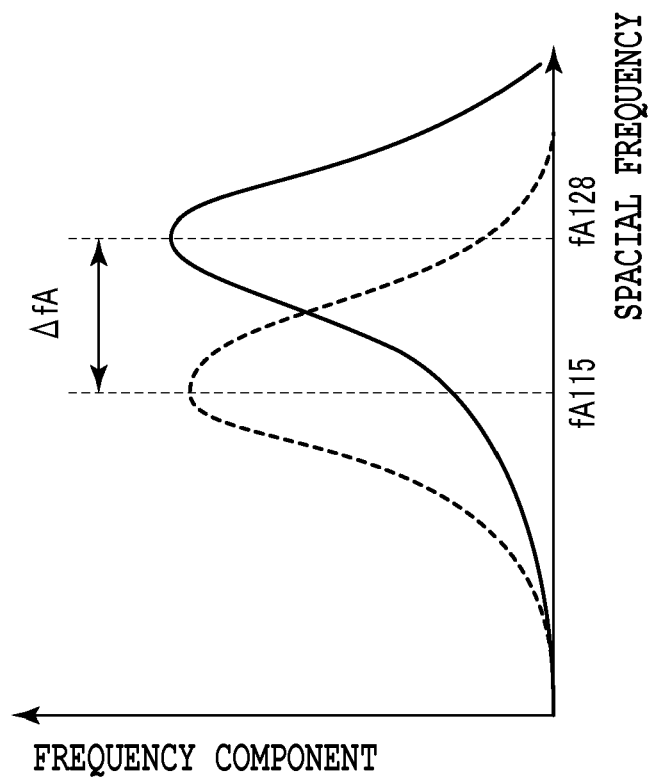

FIGS. 13A and 13B are graphs explanatory of spacial frequency characteristics of dot arrangement patterns on the normal ejection amount level and the maximum ejection amount level, as described above, respectively. In FIGS. 13A and 13B, a lateral axis represents a spacial frequency of a pattern of dot arrangement whereas a vertical axis represents a frequency component (i.e., a spectrum). FIG. 13A illustrates frequency characteristics in the case of the use of the dither matrix A: in contrast, FIG. 13B illustrates frequency characteristics in the case of the use of the dither matrix B. Moreover, in FIGS. 13A and 13B, a solid line indicates frequency characteristics on the normal ejection amount level whereas a broken line indicates frequency characteristics on the maximum ejection amount level. Additionally, in these drawings, frequencies at which spectra appear, that is, spacial frequencies of dot arrangement patterns are designated by fA115, fA128, fB115, and fB128.

Upon comparison of the characteristics with the dither masks A and B on the maximum ejection level in FIGS. 13A and 13B, the dither mask A has a higher frequency, and therefore, fA115>fB115. In contrast, also upon comparison of the characteristics on the normal ejection level, the dither mask A has a higher frequency, and therefore, fA128>fB128.

Here, a dither mask is generally designed such that as the number of dots on a dot arrangement pattern formed with the dither mask is increased from 0 to 255, its spacial frequency also is uniformly increased to become highest in substantially a half tone. In accordance with this design, the higher frequency the dither mask, the greater a difference $\Delta f$ in spacial frequency according to a change in the number of dots. Assuming that $\Delta$fA and $\Delta$fB represent differences in spacial frequency of the dither masks A and B in the case where the numbers of dots are 128 and 115, respectively, they are expressed by the following equations:

$$\Delta fA = fA128 - fA115$$

$$\Delta fB = fB128 - fB115.$$

As illustrated in FIGS. 13A and 13B, $\Delta$fA>$\Delta$fB.

That is to say, the difference in frequency between the dot arrangement patterns becomes smaller with the dither mask B having the lower spacial frequency in the case where the number of dots or the dot arrangement pattern is changed. In other words, the use of the dither mask having the lower spacial frequency can reduce the difference in spacial frequency between the different dot arrangement patterns. In this manner, as the difference in ejection amount becomes greater, a difference in granularity, that is, the frequency unevenness can be reduced with the dither mask having the lower spacial frequency.

As illustrated in FIG. 11, the ejection amount levels are determined in the areas [X], and then, the number of dots, that is, the dot arrangement pattern after the quantization with the dither masks A and B with respect to the gradation value of device image data can be obtained based on the ejection amount levels. As a consequence, the granularity in the area [X] can be determined per dither mask.

Figure 14:
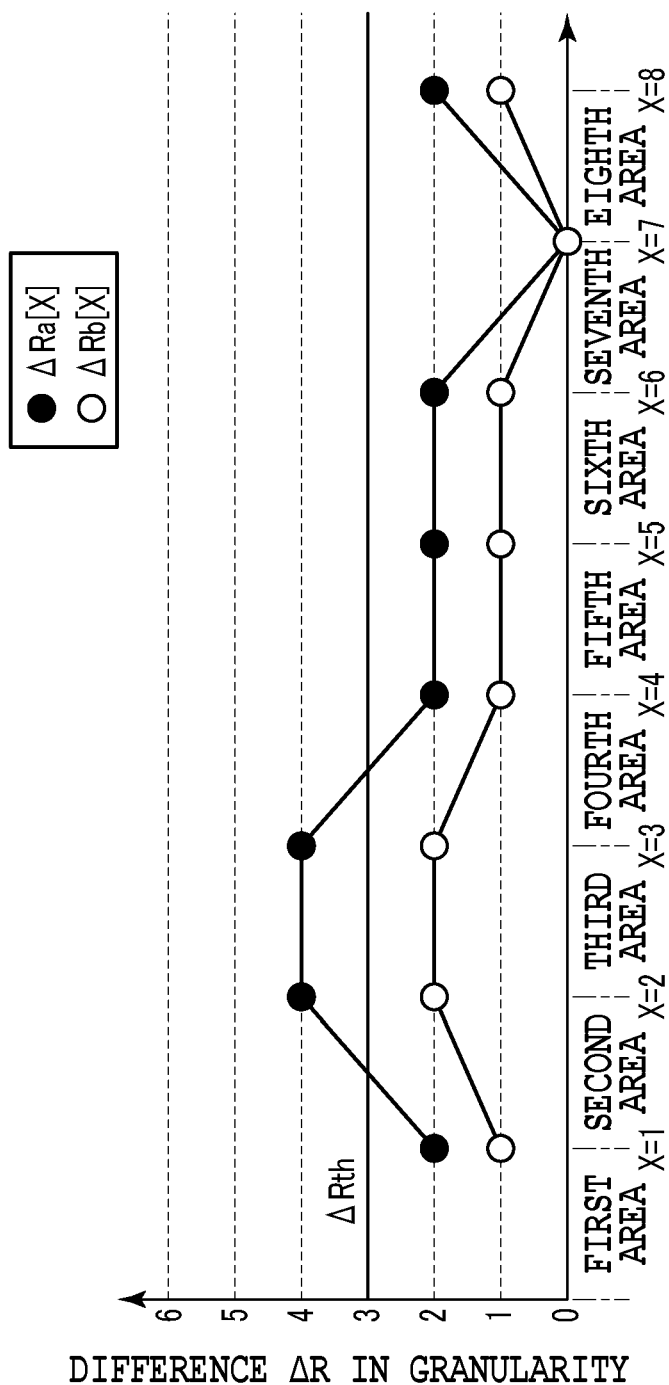
FIG. 14 is a graph illustrating a difference in granularity calculated based on the ejection amount level in each of the nozzle groups per area.

FIG. 14 is a graph illustrating differences in granularity after the quantization with the dither masks A and B based on the ejection amount levels in the areas [X] illustrated in FIG. 11. Assuming that Ra[X] designates a granularity in the area [X] with the dither mask A, and further, $\Delta$Ra[X] denotes a difference in granularity between the adjacent areas, the difference in granularity can be expressed by the following equation:

$$\text{Difference } \Delta Ra[X] \text{ in granularity} = |Ra[X] - Ra[X-1]|.$$

Filled circles in FIG. 14 indicate the difference in granularity with the dither mask A. A difference $\Delta$Rb[X] in granularity with the dither mask B can be obtained in the same manner, and further, open circles in FIG. 14 indicate the difference in granularity with the dither mask B.

In an example with the dither mask A illustrated in FIG. 14, a difference $\Delta$Ra[2] in granularity between the second and third areas and a difference ΔRa[3] in granularity between the third and fourth areas are greatest, that is, 4. In the meantime, although the greatest difference ΔRb[X] in granularity with the dither mask B appears at positions where X=2 and X=3 in the same manner as the dither mask A, it is 2.

As described above, the visual limit ΔRTh of the difference in granularity is set to 3 in the present embodiment. In FIG. 14, the maximum value of ΔRa[X] is 4 which exceeds ΔRTh. Specifically, when the dither mask A is used on the ejection amount level in the example illustrated in FIG. 11, frequency unevenness is visually recognized between the second and third areas. In contrast, since the maximum value of ΔRb[X] with respect to the dither mask B is 2, ΔRb[X] does not exceed ΔRTh in any of the areas. More specifically, no frequency unevenness that is visually recognized cannot occur. Since ΔRb[X] with the dither mask B on the ejection amount level illustrated in FIG. 11 is lower than the granularity threshold which can be allowed from the viewpoint of a predetermined quality of an image, the use of the dither mask B can allow the granularity while reducing the frequency unevenness down to the visual limit or lower.

Figure 15:
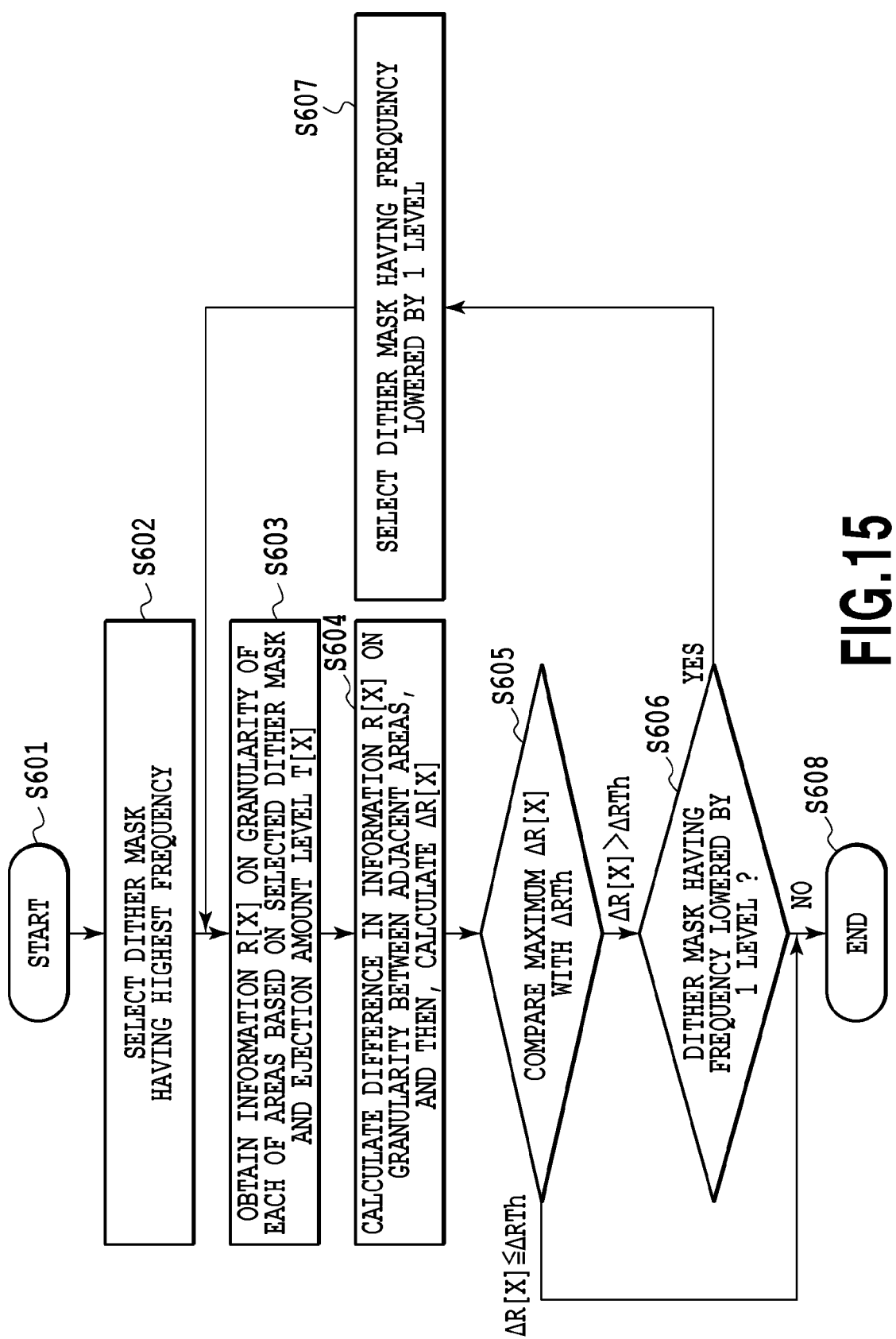
FIG. 15 is a flowchart illustrating dither mask selection relevant to reduction of frequency unevenness according to a first embodiment of the present invention.

FIG. 15 is a flowchart illustrating dither mask selection for reducing the frequency unevenness. First, in step S602, one dither mask having a highest spacial frequency is selected from the plurality of dither masks that are read from the HDD 303 in the PC 300 and stored in the RAM 312. Next, in step S603, a granularity R[X] is obtained based on the selected dither mask and the ejection amount level T[X] in each of the areas with reference to the above-described table. Moreover, in step S604, differences ΔR[X] in granularity between the adjacent areas are calculated with respect to all of the areas.

In step S605, a maximum value out of the differences ΔR[X] in granularity calculated in step S604 is obtained, and then, the resultant maximum difference in granularity is compared with the determination threshold ΔRTh. If the maximum difference ΔR[X] is smaller than the threshold ΔRTh, the use of the selected dither mask is decided, and thus, the processing comes to an end. In contrast, if the maximum difference ΔR[X] is equal to or greater than the threshold ΔRTh, it is determined in step S606 whether or not a dither mask having a spacial frequency lower than that of the selected dither mask is stored in the RAM 312. If the result is negative, the use of the selected dither mask is decided, and thus, the processing comes to an end. In the meantime, when there is a dither mask having a lower spacial frequency, a dither mask having a spacial frequency lower by one level than that of the selected dither mask is selected in step S607. Thereafter, the processing is returned to step S603, and then, the above-described processing is repeated with respect to the newly selected dither mask.

With the above-described processing, one dither mask capable of printing an image under the visual limit of the frequency unevenness can be selected from the plurality of dither masks having the acceptable granularity. Consequently, the selected dither mask is used in the quantizing part 407, and thus, the frequency unevenness occurring by the HS processing 405 can be reduced within the acceptable range of the granularity.

The above description has been given of previously storing the table parameters for calculating the granularity based on the combinations of the dither masks with the ejection amount levels H[X], thus selecting the optimum dither mask based on the difference ΔR in granularity between the maximum ejection amount level and the minimum ejection amount level. Although the difference has been taken between the adjacent areas in calculating ΔR[X] in the present embodiment, a difference may be taken at an interval of, for example, 1.0 cycle/mm on a print medium in consideration of the human visual characteristics, as described above. Although the present invention has been described with the dither mask, it is not limited to this. For example, pseudo half tone processing such as error dispersion may be adopted. Furthermore, not the difference in granularity but a ratio of the granularity on the maximum ejection amount level to the granularity on the minimum ejection amount level may be adopted.

Figure 16:
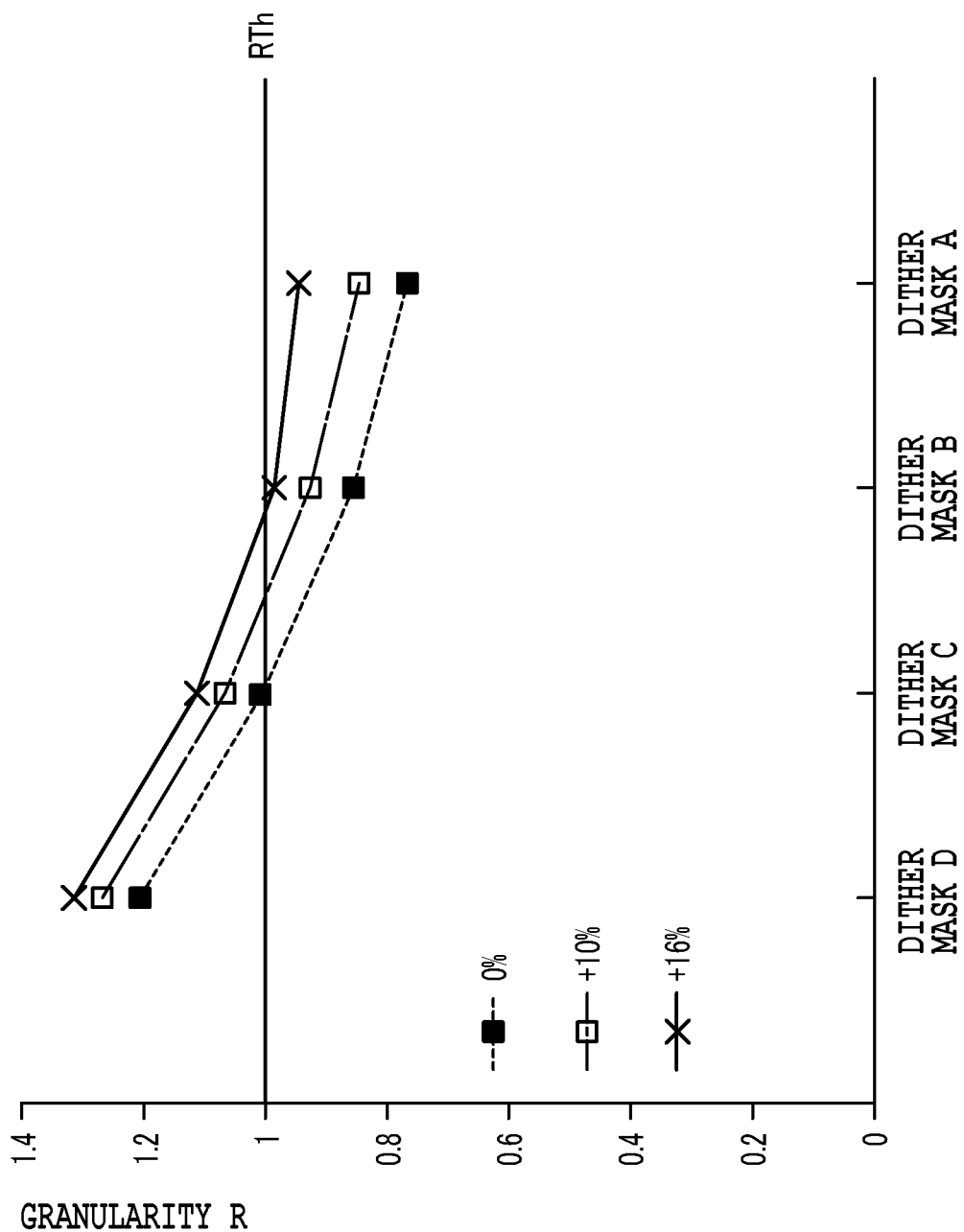
FIG. 16 is a graph illustrating values obtained by simulating a granularity in maximum ejection amount with four kinds of dither masks having different spacial frequencies.

Incidentally, a printing system A in which the ejection amount of a print head varies within a range from +10% to −10% with respect to the normal ejection amount (0%) of a print head and a printing system B in which the ejection amount of a print head varies within a range from +16% to −16% are assumed in the present embodiment, and then, the granularity is simulated. First, four dither masks A, B, C, and D (256 pixels×256 pixels) having different spacial frequencies are prepared. The dither mask A is a generally known blue-noise mask. Here, it is assumed that the dither mask B has a spacial frequency lower by 3.125% than that of the dither mask A; the dither mask C has a spacial frequency lower by 6.25%; and the dither mask D has a spacial frequency lower by 9.375%. With these dither masks A, B, C, and D, granularities R in a nozzle group having an ejection amount of +10% and a nozzle group having an ejection amount of +16% are calculated. The result is shown in FIG. 16. Here, an ink signal to be input is 160 (8 bit). In the present experiment, the calculated granularities are standardized such that the allowable granularity threshold RTh becomes 1.00. As is obvious from FIG. 16, the dither mask A has a high quality of an image and a high frequency, and therefore, even if the ejection amount varies from the normal value (0%) to a maximum value of +16%, all of the granularities R fall into the allowable range. Moreover, all of the granularities R with respect to the dither mask B are allowable. On the other hand, since the dither mask C has a considerably low spacial frequency, the granularity R exceeds the allowable limit RTh in an ejection amount of +10%, although the granularity R of the head for ejecting ink in the normal ejection amount (0%) is allowable. Referring to FIG. 16, when the dither masks A and B are used in the printing systems A and B, their granularities are allowable. In contrast, the masks having the spacial frequencies lower than that of the dither mask C cannot be used in the printing systems A and B.

Figure 17:
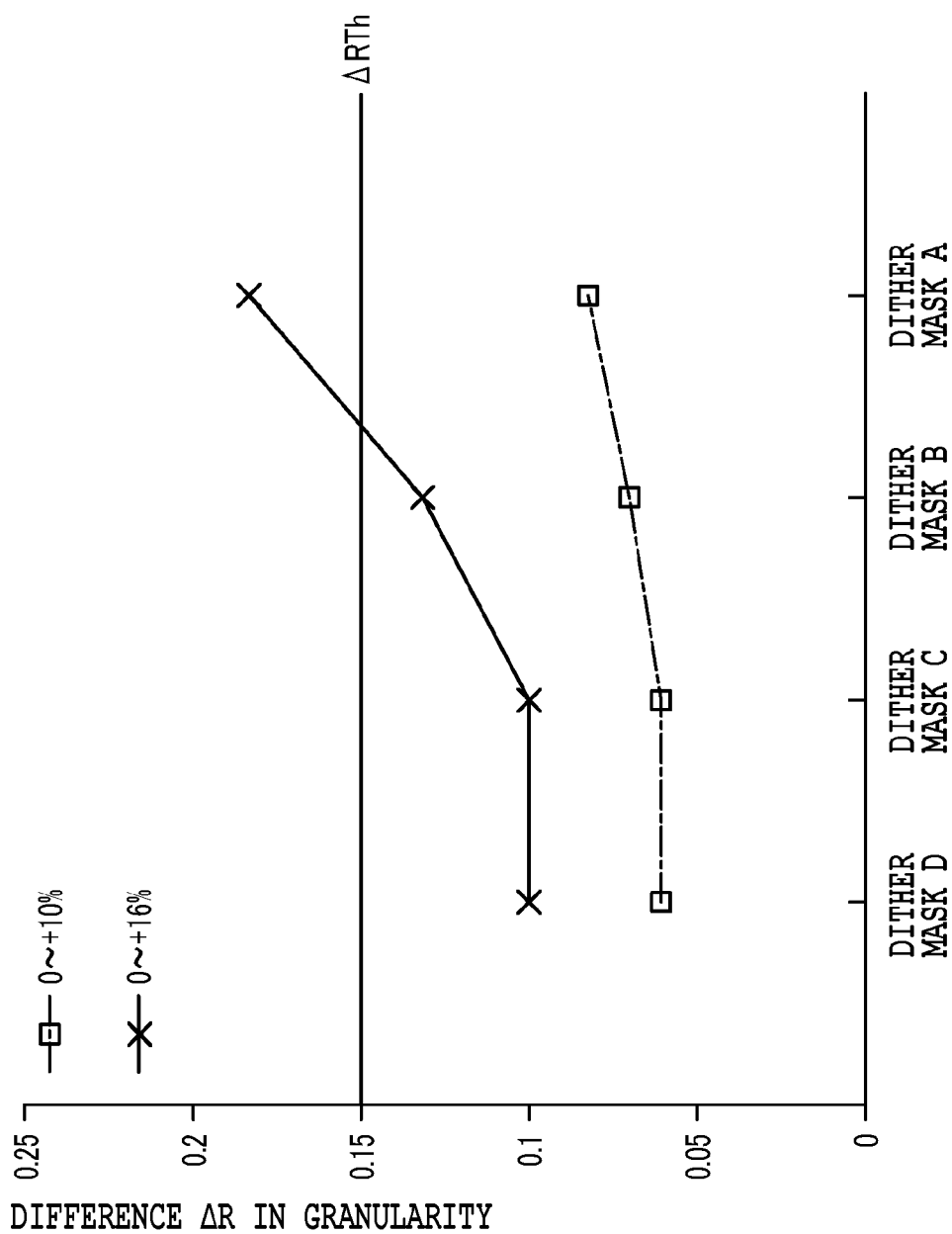
FIG. 17 is a graph illustrating values obtained by simulating a difference in granularity in the maximum ejection amount with the four kinds of dither masks having different spacial frequencies.

Subsequently, FIG. 17 illustrates the relationship of differences AR in granularity in the printing systems A and B with the four dither masks. A solid line in FIG. 17 indicates differences AR in granularity between the normal ejection amount (0%) and the maximum ejection amount (+10%) in the printing system A: in contrast, a broken line in FIG. 17 indicates differences ΔR in granularity between the normal ejection amount (0%) and the maximum ejection amount (+16%) in the printing system B. Here, the allowable difference ΔRTh in granularity is set to 0.15 in FIG. 17. This value may be empirically determined. The difference in granularity at a difference of 16% in ejection amount is greater than that at a difference of 10% in ejection amount with respect to all of the dither masks. As described above, this signifies that as the difference in ejection amount is greater, the difference in granularity that is visually observed on a print medium also becomes greater. It is found from FIG. 17 that a difference of 16% in ejection amount with respect to the dither mask A exceeds the allowable difference ΔRTh in granularity. More specifically, in the case where the head of the normal ejection amount is adjacent to the head of a maximum ejection amount of +16%, the dither mask A unfavorably makes the frequency unevenness conspicuous.

In designating a dither mask, only when both of the allowable granularity RTh illustrated in FIG. 16 and the allowable difference ΔRTh in granularity illustrated in FIG. 17 are satisfied, the dither mask can be used in the printing system. Referring to FIGS. 16 and 17, the dither masks A and B can be used in the printing system A. Here, the dither mask A has a high quality of an image and a high frequency, and therefore, the use of the dither mask A is desired in this case. In contrast, when the dither mask A is used in the printing system B, the difference in granularity of the dither mask A exceeds the allowable difference ΔRTh in granularity. More specifically, the frequency unevenness is visually recognized. In the printing system B, the use of the dither mask B can satisfy both of the values RTh and ΔRTh.

Figure 18:
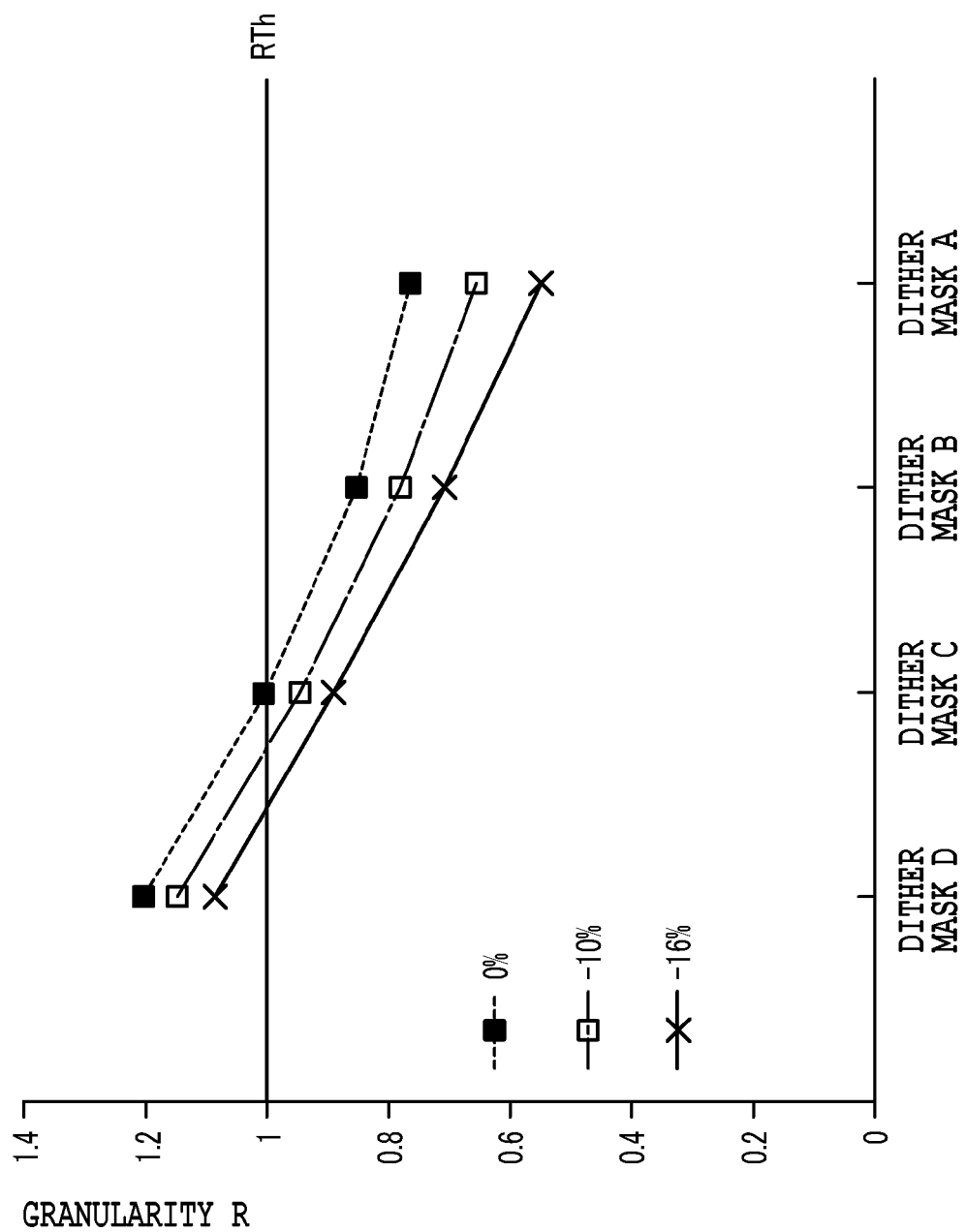
FIG. 18 is a graph illustrating values obtained by simulating a granularity in minimum ejection amount with four kinds of dither masks having different spacial frequencies.
Figure 19:
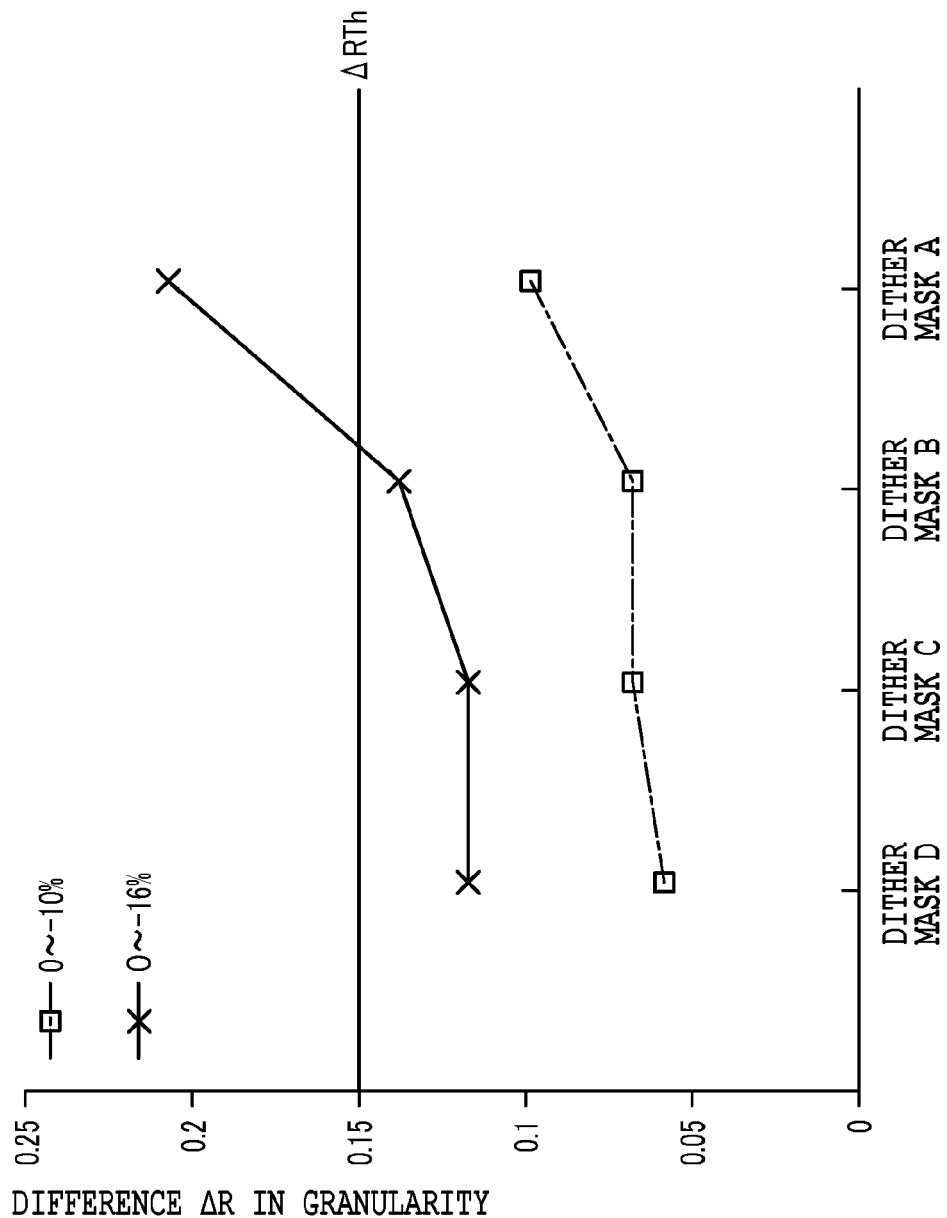
FIG. 19 is a graph illustrating values obtained by simulating a difference in granularity in the minimum ejection amount with the four kinds of dither masks having different spacial frequencies.

FIGS. 18 and 19 illustrate the cases of ejection amount of −10% in the printing system A and ejection amount of −16% in the printing system B, respectively. The same goes for a print head having ejection amount lower than the normal ejection amount from the qualitative viewpoint.

As described above, when an image is printed by the plurality of nozzles, it is possible to reduce the difference in dot arrangement pattern, that is, the frequency unevenness caused by the correction of the variations in ejection characteristics between the plurality of nozzles by the HS processing in printing an image by the nozzles in the present embodiment. That is to say, in order to reduce the frequency unevenness, the granularity is calculated based on the ejection characteristics between the nozzles, thus obtaining the difference in granularity between the adjacent areas. According to the difference in granularity, one processing is selected from the plurality of quantizations previously stored, followed by the quantization. In this manner, the frequency unevenness that could not be overcome by the conventional HS processing can be reduced. In order to enhance the quality of an image, the unit area may be appropriately set in consideration of a processing speed or a memory capacity, although the unit area should desirably correspond to one nozzle.

Although the description has been given of the case where all of the four nozzles in the nozzle group corresponding to the processing unit in the HS processing eject the ink in the same ejection amount, the respective ejection characteristics of the nozzles in one nozzle group may be possibly varied. Even in such a case, an average granularity in the same area is acquired, followed by conversion in such a manner as to correct the resultant difference in color by all of four nozzles, thus producing the above-described advantageous effects.

Moreover, storing the plurality of dither masks capable of reducing the frequency unevenness can achieve an increase in limit value (i.e., +10% to −10% in the present embodiment) of the variations in ejection amount that occurs during fabricating the print head. This will be explained with reference to FIGS. 16 and 17. In the case of a printing system having only a dither mask A, an image can be printed without causing any uneven frequencies since a difference ΔR in granularity is lower than ΔRTh with the use of a print head that causes a variation of +10% in ejection amount, as illustrated in FIG. 17. In contrast, a difference ΔR in granularity unfavorably exceeds ΔRTh when a print head that causes a variation of +16% in ejection amount is used. In this case, if the printing system has only the dither mask A, the print head that causes variations of +16% to −16% in ejection amount cannot be used even if the maximum granularity is lower than the allowable granularity (i.e., RTh). However, the allowable granularity (i.e., RTh) is satisfied while the difference ΔR in granularity can be suppressed to ΔRTh or lower even if the print head causes a variation of +16% in ejection amount when the printing system has the dither mask B, as illustrated in FIG. 17. In summary, the printing system is provided with the plurality of dither masks having the different spacial frequencies, thus enabling the limit value of the variations in ejection amount during fabricating the print head to be increased more than in the prior art.

(Second Embodiment)

The above-described description has been given of the first embodiment in which the previously created table parameters are referred to when the granularity R[X] per area [X] is obtained. In the present embodiment, an arbitrary dither mask is selected; a measuring image is printed on a print medium, to be read by a scanner; and thereafter, a granularity R[X] is obtained per area [X] based on the read result.

Figure 20:
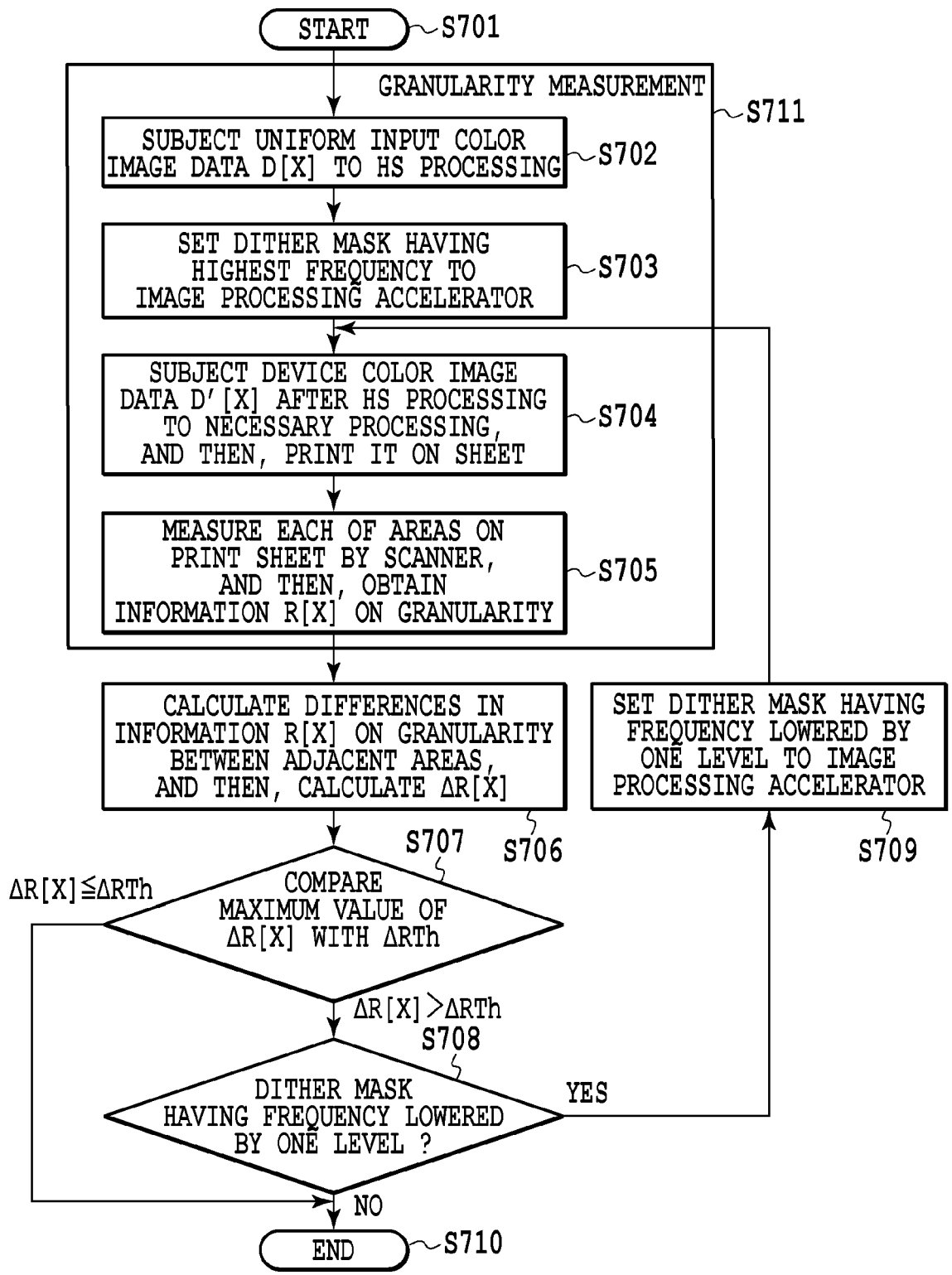
FIG. 20 is a flowchart illustrating dither mask selection relevant to reduction of frequency unevenness according to a second embodiment of the present invention.

FIG. 20 is a flowchart illustrating selection of a dither mask according to the present embodiment. First, HS processing 405 is performed in step S702, in which image data is corrected according to ejection characteristics of a nozzle group corresponding to a processing unit in the HS processing. Next, in step S703, a dither mask having a highest spacial frequency is selected from a plurality of dither masks that are read from an HDD 303 in a PC 300 to be stored in a RAM 312, and then, it is set to an image processing accelerator 316. In step S704, the image data is subjected to TRC processing 406 and quantization 407 with the selected dither mask, so that an image is printed on a print medium.

Subsequently, in step S705, the printed image is read by the scanner, and then, a granularity R[X] is calculated per area [X]. Furthermore, in step S706, differences ΔR[X] in granularity between the adjacent areas are calculated with respect to all of the areas.

In step S707, a maximum value of the difference ΔR[X] in granularity such calculated as described above is obtained, then to be compared with a threshold ΔRTh. If the maximum value of the difference ΔR[X] in granularity is the threshold ΔRTh or lower, the use of the selected dither mask is determined, and then, the processing comes to an end. When the maximum value of the difference ΔR[X] in granularity exceeds the threshold ΔRTh, it is determined in step S708 whether or not a dither mask having a spacial frequency lower than that of the selected dither mask is stored in the RAM 312. If the result is negative, the use of the selected dither mask is determined, and then, the processing comes to an end. In contrast, if the result is affirmative, a dither mask having a spacial frequency lower by one level than that of the selected dither mask is selected in step S709, and then, it is set to the image processing accelerator 316. Thereafter, the processing returns to S704, in which the above-described processing is repeated with respect to the newly selected dither mask.

With the above-described processing, the dither mask capable of printing an image with the frequency unevenness below the limit of the visual recognition can be selected from the plurality of dither masks having the allowable granularity. As a consequence, the selected dither mask is used in the quantizing part 407, so that the frequency unevenness caused by the HS processing 405 can be reduced to the minimum value within the allowable range of the granularity.

The above-described description has been given of the embodiment in which the image printed on the print medium after the HS processing is read by a scanner 107, and then, its granularity is calculated, thus determining the usable dither mask. Since the granularity is measured directly from the print medium in the embodiment, the granularity can be more accurately determined than in the first embodiment irrespective of an individual error of a printing system. Although the difference ΔR[X] in granularity is calculated between the adjacent areas in the present embodiment, a difference may be taken at an interval of, for example, 1.0 cycle/mm on a print medium in consideration of the human visual characteristics, as described above. Although the present invention has been described with the dither mask, the present invention is not limited to this. For example, other pseudo half tone processing such as error diffusion may be used according to the present invention.

(Third Embodiment)

In the above-described first embodiment, the threshold $\Delta RTh$ of the difference in granularity used for replacing the dither mask is set to the unique predetermined value. And thus, the determination has been always made with $\Delta RTh$ at any ejection amount levels and any spacial frequencies in the first embodiment. In the present embodiment, the threshold $\Delta RTh$ of the difference in granularity used for the threshold determination is obtained based on two factors, that is, ejection amount levels and spacial frequencies.

If a dot size is small enough to be negligible for human visibility, the determination threshold $\Delta RTh$ can be uniquely set in determining the difference in granularity (see step S605 in FIG. 15). However, as the dot size becomes greater, it is likely to be visually recognized, and therefore, the granularity is increased. Consequently, when the dot size markedly influences the granularity, the determination threshold $\Delta RTh$ should be desirably varied accordingly. In the present embodiment, the dot size is determined according to the ejection amount level. That is to say, the greater the dot size, the higher the ejection amount level, and therefore, as the ejection amount level becomes higher, the threshold $\Delta RTh$ is set to be lower. The threshold $\Delta RTh$ may be experimentally obtained within a variable range of ejection amount during fabrication or may be obtained by a generally known granularity calculating method such as an RMS granularity.

In the meantime, with respect to a dot arrangement pattern formed with a dither mask, the determination threshold $\Delta RTh$ should be desirably varied in the same manner as described above according to its spacial frequency. In the case of, for example, a dense dot arrangement pattern, that is, a low-frequency dot arrangement pattern, dots are closer to each other, and therefore, the dots are liable to be visually recognized as large dots. In other words, the granularity becomes higher. Therefore, in determining the difference in granularity (see step S605 in FIG. 15), as the spacial frequency of the dot arrangement pattern is lower, the determination threshold $\Delta RTh$ is set to be greater. When the spacial frequency of the dot arrangement pattern is slightly decreased, the granularity becomes conspicuous, and therefore, it is desirable that the current dither mask should be readily replaced with a next one. To the contrary, as the spacial frequency of the dot arrangement pattern is higher, the determination threshold $\Delta RTh$ is set to be smaller. When the spacial frequency is higher, the granularity becomes inconspicuous, and therefore, the frequency of replacement of a dither mask should be decreased. More specifically, the value $\Delta RTh$ should be increased. In this manner, the number of steps of determining the difference in granularity (see step S605 in FIG. 15) can be reduced, and further, the number of dither masks having a high spacial frequency to be prepared can be reduced. Specific methods include storing the relationship between input pixel values and the spacial frequencies of dot arrangement patterns as table data. Here, the relationship can be experimentally created in advance. The spacial frequencies of dot arrangement patterns are obtained with reference to table parameters based on a dither mask to be used and an input pixel value.

The description has been given above of the embodiment in which the determination threshold $\Delta RTh$ of the difference in granularity is determined according to the two variables, that is, the ejection amount level and the spacial frequency of the dot arrangement pattern. FIG. 21 is a table illustrating the relationship between the two variables and the determination threshold $\Delta RTh$. In FIG. 21, the ejection amount levels are shown in columns whereas the spacial frequencies of dot arrangement patterns are shown in rows. The numerical values $\Delta RTh$ in the table are standardized in the same manner as that illustrated in FIG. 17. The higher the ejection amount level, the smaller the threshold $\Delta RTh$ (downward in FIG. 21). Since the granularity becomes more conspicuous as the dot size becomes larger, a dither mask is readily replaced with an optimum one. In the meantime, as the spacial frequency of a dot arrangement pattern becomes higher (rightward in FIG. 21), the threshold $\Delta RTh$ becomes greater. Since the granularity is degraded as the spacial frequency becomes higher, a dither mask need not be replaced more than necessary.

Furthermore, the threshold $\Delta RTh$ may be determined based on either one of the ejection amount level and the spacial frequency of a dot arrangement pattern according to the characteristics of a print head or the capacity of a printing system. Alternatively, the threshold $\Delta RTh$ may be varied according to a dither mask to be used during the HS processing.

(Fourth Embodiment)

Figure 22:
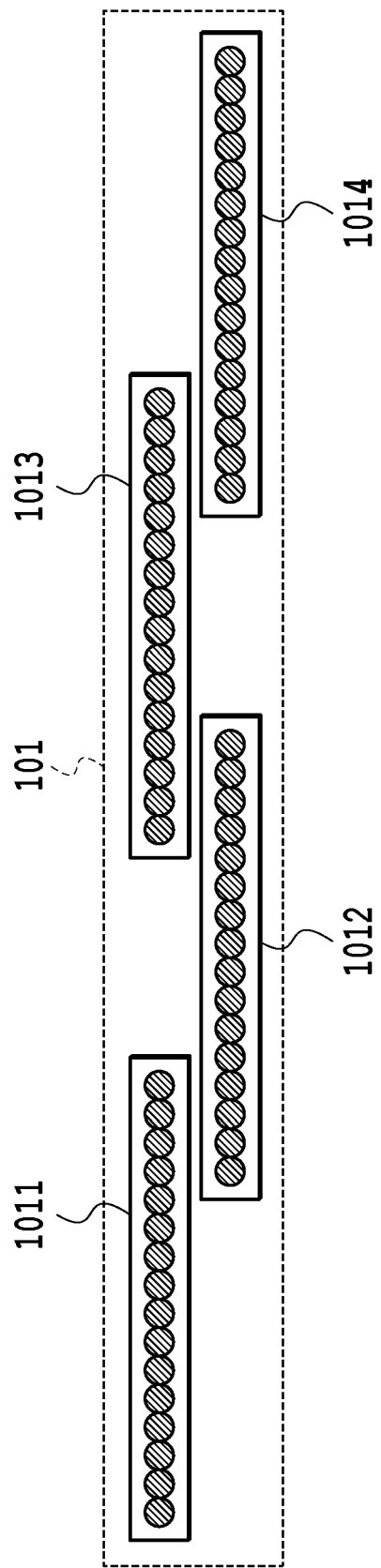
FIG. 22 is a diagram explanatory of the configuration of a print head in an embodiment usable in the present invention.

The above-described first embodiment uses the print head having the plurality of ejection boards 1011 to 1013 arranged adjacently to each other in the nozzle array direction, as described above with reference to FIG. 2. The present embodiment uses a print head having a plurality of ejection boards alternately arranged, as illustrated in FIG. 22. This print head is such configured as to have the ejection boards alternately shifted in a direction perpendicular to a nozzle array direction, and further, to have the ejection boards adjacent to each other overlap by a predetermined width. In FIG. 22, a right nozzle group (consisting of four nozzles) of an ejection board 1011 overlaps with a left nozzle group of an ejection board 1012 by two nozzle groups. The number of overlapping nozzle groups does not matter in the present embodiment.

Figure 23:
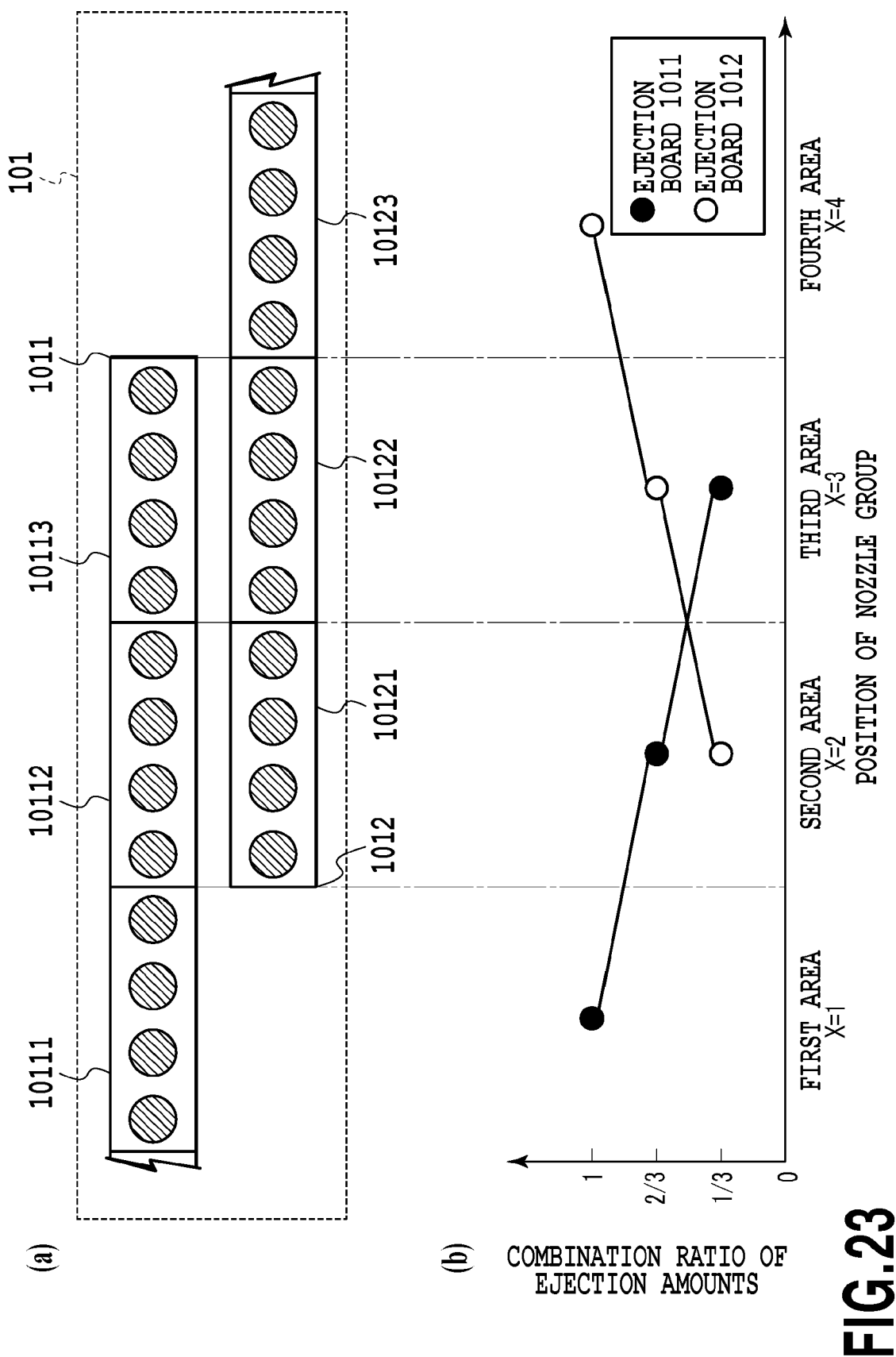
FIG. 23 is a diagram illustrating, in enlargement, the print head illustrated in FIG. 22 and a graph explanatory of ejection amount levels, respectively.

FIG. 23(*a*) is a diagram illustrating, in enlargement, an overlapping section of a print head illustrated in FIG. 22. A nozzle group 10112 in the ejection board 1011 overlaps with a nozzle group 10121 in the ejection board 1012, and further, a nozzle group 10113 overlaps with a nozzle group 10122. With this configuration of the print head, the combination ratio of ink ejection amount should be desirably set as illustrated in FIG. 23(*b*). It is assumed that a pixel value is input in such a manner as to print 12 dots per unit area. A nozzle group 10111 in the ejection board 1011 prints 12 dots. The nozzle group 10112 prints ⅔ of 12 dots, that is, 8 dots. In this case, one nozzle should print two dots. The nozzle group 10113 prints ⅓ of 12 dots, that is, 4 dots. In this case, one nozzle should print one dot. In the meantime, the nozzle group 10121 in the ejection board 1012 prints ⅓ of 12 dots, that is, 4 dots. The nozzle group 10122 prints ⅔ of 12 dots, that is, 8 dots. A nozzle group 10123 prints 12 dots. In this manner, the combination ratio per nozzle group is varied, so that 12 dots are printed at all of areas.

However, if the dot sizes are different between the nozzle groups 10112 and 10121, dots having different sizes are interspersed within a dot arrangement pattern to be printed in a second area (X=2) because of the HS processing. In other words, in comparison with the first embodiment, the granularity in the area [X] in which the nozzle groups overlap each other becomes high. Consequently, the granularity is determined with table parameters different from the granularity determination used in the first embodiment with respect to the area [X] in which the nozzle groups overlap each other in FIG. 23(a). In one example, the ejection amount of the nozzle group 10112 is assumed to be substantially the same as that of the nozzle group 10111 adjacent thereto, and therefore, the dots in the ejection amount by the nozzle group 10111 are assumed to be printed on the dot arrangement pattern by ⅔ thereof: in contrast, the ejection amount of the nozzle group 10121 is assumed to be substantially the same as that of the nearest nozzle group 10123 that does not overlap any nozzle group, and further, the dots in the ejection amount by the nozzle group 10121 are assumed to be printed on the dot arrangement pattern by ⅓ thereof. Here, the relationship between the ejection amount levels and the combination ratios has been previously stored as table parameters, and then, the granularity can be accurately determined with reference to the table parameters. This processing should be desirably taken since the variations in ejection amount between the different ejection boards are generally greater than the variations in ejection amount between the adjacent nozzle groups inside of one and the same ejection board during the fabrication of a print head. In another example, the image printed on the print medium after the HS processing is read by the scanner 107, and then, the granularity is calculated, as described in the second embodiment. In this manner, the granularity is estimated from the ejection amount level with reference to the table parameters, and thus, the same result can be produced.

Additionally, in determining the difference in granularity, the difference in granularity can be determined in various manners with respect to areas in which nozzle groups overlap or do not overlap. In one example, the determination threshold ΔRTh of the difference in granularity obtained based on the two variables, that is, the ejection amount levels and the spacial frequencies of the dot arrangement patterns may be used with respect to an area in which nozzle groups overlap, as described in the third embodiment. The table parameters illustrated in FIG. 21 are conceived to be created for each of the above-described combination ratios.

Incidentally, as long as the variations in ejection amount do not influence the granularity of the dot arrangement pattern in each of the ejection boards, the granularity and the difference in granularity in the print head illustrated in FIG. 22 may be determined in the same processing as that with the print head in the first embodiment.

(Other Embodiments)

Although the descriptions have been given above of the first to fourth embodiments, the processing contents are merely exemplified. As long as the frequency unevenness can be reduced over the entire length of the print head, any configurations may be used. One mask is selected from the plurality of quantizing masks in the embodiments of the present invention. However, if the quantization can be performed with different quantizing masks in areas over the entire length of the print head, the frequency unevenness to be overcome by the present invention becomes inconspicuous. Thus, all of the areas may not always be quantized with one quantizing mask.

Additionally in the above-described embodiments, the nozzle array is divided into the plurality of nozzle groups in the nozzle array direction, wherein one nozzle group consists of the four nozzles. The unit area on the print medium to be defined by one nozzle group is referred to as one area, and further, it is set as a minimum unit for the granularity determination. As described above, the present invention is not limited to such a unit. For example, an area defined by more nozzles may be referred to as one unit, or one nozzle may be referred to as one nozzle group. Moreover, the number of nozzles included in each of the areas need not always be identical to each other. The number of nozzles included in each of the areas may be appropriately set according to the characteristics of a device. In the plurality of nozzle arrays for ejecting the plurality of inks, the conversion tables may correspond to combinations of the nozzle groups for printing the same area on the print medium, respectively.

Moreover, although the description has been given of the embodiment in which the inks of the four colors, that is, cyan, magenta, yellow, and black are used in the embodiments, the present invention is not limited to this. The present invention is applicable to any embodiments as long as two or more inks are used. Any of red, green, blue, orange, violet, light cyan, light magenta, gray, and light gray inks may be used in addition to the above-described four colors.

Furthermore, although the dither mask is used for the binarization in the embodiments, the present invention is not limited to this. For example, 256-value image data is quantized into 4-value data, and then, binarization may be performed with dot arrangement patterns corresponding to levels indicated by the 4-value data. Additionally, although the printing apparatus of the ink jet system has been described in the above-described embodiments, the present invention is not limited to this. For example, the present invention may be applied to a printing apparatus of a system for forming dots by thermal transferring or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-252265, filed Nov. 16, 2012, which is hereby incorporated by reference herein in its entirety.

What is claimed is:

1. An image processing apparatus that generates print data for performing printing on a print medium using a printing element array in which a plurality of printing elements are arrayed, said apparatus comprising:
   a correction unit configured to, for each of a plurality of processing units corresponding to a plurality of printing element groups, respectively, which are obtained by dividing a plurality of printing elements in the printing element array and which are used for printing images on different unit areas of the print medium, respectively, correct image data of a pixel, which corresponds to a printing element in a printing element group, according to print characteristics of the printing element in the printing element group;
   an obtaining unit configured to obtain information about a difference in granularity between unit areas based on print characteristics of the printing elements in the printing element groups corresponding to the unit areas; and
   a quantizing unit configured to quantize the image data corrected by said correction unit using a quantizing mask, said quantizing unit selecting the quantizing mask used for quantizing the image data for the printing element groups corresponding to the unit areas, based on the information obtained by said obtaining unit, from at least two quantizing masks having different spacial frequency characteristics.

2. The image processing apparatus as claimed in claim 1, further comprising;
   a granularity calculating unit configured to calculate the granularity for the print image printed in each of the unit areas, based on the print characteristics of the printing element group for each processing unit, which corresponds to the printing element group, and wherein the obtaining unit obtains the information based on the granularity calculated by said granularity calculating unit and the print image is printed based on the image data corrected for each of the processing units by said correction unit.

3. The image processing apparatus as claimed in claim 2, wherein said granularity calculating unit previously determines the granularity for each combination of the print characteristics of the printing element group and the quantizing mask, and specifies the print characteristics of the printing element group and the quantizing mask for obtaining the granularity.

4. The image processing apparatus as claimed in claim 2, wherein said granularity calculating unit performs printing using the print element array based on the print data corrected by said correction unit, causes a measuring unit to measure the printed image, and calculates the granularity for each processing unit based on a result of the measurement.

5. The image processing apparatus as claimed in claim 1, wherein said obtaining unit obtains the information about the difference in granularity between the unit areas that have a predetermined interval between them.

6. The image processing apparatus as claimed in claim 1, wherein said quantizing unit selects the quantizing mask according to a comparison result of the information about the difference in granularity with a predetermined threshold.

7. The image processing apparatus as claimed in claim 6, wherein the predetermined threshold is generated based on both or either one of the print characteristics of the printing element group and patterns of dot arrangements formed according to quantizing masks.

8. The image processing apparatus as claimed in claim 1, wherein the quantizing mask is a dither mask.

9. The image processing apparatus as claimed in claim 1, wherein said correction unit corrects the image data so that a difference in print density between the images printed on the unit areas is reduced.

10. The image processing apparatus as claimed in claim 1, wherein the print characteristics of the printing element in the printing element group is an amount of ink ejected by the printing element.

11. A printing apparatus that uses a printing element array in which a plurality of printing elements are arrayed and performs printing based on print data, said apparatus comprising:

a print head provided with the printing element array;

a correction unit configured to, for each of a plurality of processing units corresponding to a plurality of printing element groups, respectively, which are obtained by dividing a plurality of printing elements in the printing element array and which are used for printing images on different unit areas of a print medium, respectively, correct image data of a pixel, which corresponds to a printing element in a printing element group, according to print characteristics of the printing element in the printing element group;

an obtaining unit configured to obtain information about a difference in granularity between unit areas based on print characteristics of the printing elements in the printing element groups corresponding to the unit areas; and a quantizing unit configured to quantize the image data corrected by said correction unit using a quantizing mask, said quantizing unit selecting the quantizing mask used for quantizing the image data for the printing element groups corresponding to the unit areas, based on the information obtained by said obtaining unit, from at least two quantizing masks having different spacial frequency characteristics.

12. The printing apparatus as claimed in claim 11, further comprising:

a granularity calculating unit configured to calculate the granularity for the print image printed in each of the unit areas, based on the print characteristics of the printing element group for each processing unit, which corresponds to the printing element group, and wherein the obtaining unit obtains the information based on the granularity calculated by said granularity calculating unit and the print image is printed based on the image data corrected for each of the processing units by said correction unit.

13. The printing apparatus as claimed in claim 12, wherein said granularity calculating unit performs printing using the print element array based on the print data corrected by said correction unit, causes a measuring unit to measure the printed image, and calculates the granularity for each processing unit based on a result of measuring.

14. The printing apparatus as claimed in claim 13, further comprising the measuring unit configured to measure the printed image.

15. The printing apparatus as claimed in claim 11, further comprising a conveying unit configured to convey the print medium in a direction intersecting a direction in which the plurality of printing elements are arrayed, and wherein printing is performed while the print medium is conveyed by said conveying unit.

16. The printing apparatus as claimed in claim 11, wherein the quantizing mask is a dither mask.

17. The printing apparatus as claimed in claim 11, wherein said correction unit corrects the image data so that a difference in print density between the images printed on the unit areas is reduced.

18. The printing apparatus as claimed in claim 11, wherein the print characteristics of the printing element in the printing element group is an amount of ink ejected by the printing element.

19. An image processing method for generating print data for performing printing using a printing element array in which a plurality of printing elements are arrayed, said method comprising:

a correction step of, for each of a plurality of processing units corresponding to a plurality of printing element groups, respectively, which are obtained by dividing a plurality of printing elements in the printing element array and which are used for printing images on different unit areas of the print medium, respectively, correcting image data of a pixel, which corresponds to a printing element in a printing element group, according to print characteristics of the printing element in the printing element group;

an obtaining step of obtaining information about a difference in granularity between unit areas based on print characteristics of the printing elements in the printing element groups corresponding to the unit areas; and a quantizing step of quantizing the image data corrected in said correction step using a quantizing mask, said quantizing step selecting the quantizing mask used for quantizing the image data for the printing element groups corresponding to the unit areas, based on the information obtained in said obtaining step, from at least two quantizing masks having different spacial frequency characteristics.

* * * * *